(12) United States Patent
Koizumi et al.

(10) Patent No.: US 8,579,616 B2
(45) Date of Patent: *Nov. 12, 2013

(54) GEAR PUMP

(75) Inventors: Toshihiro Koizumi, Atsugi (JP);
Chiharu Nakazawa, Kawasaki (JP);
Ryohei Maruo, Kawasaki (JP)

(73) Assignee: Hitachi Automotive Systems, Ltd.,
Hitachinaka-shi (JP)

( * ) Notice: Subject to any disclaimer, the term of this patent is extended or adjusted under 35 U.S.C. 154(b) by 1028 days.

This patent is subject to a terminal disclaimer.

(21) Appl. No.: 12/620,296

(22) Filed: Nov. 17, 2009

(65) Prior Publication Data

US 2010/0124513 A1    May 20, 2010

(30) Foreign Application Priority Data

Nov. 17, 2008    (JP) .................. 2008-292906

(51) Int. Cl.
*F04C 15/00* (2006.01)
*F01C 19/08* (2006.01)
(52) U.S. Cl.
USPC ..................... 418/126; 418/129; 418/132
(58) Field of Classification Search
USPC ................... 418/131, 132, 125–129
See application file for complete search history.

(56) References Cited

U.S. PATENT DOCUMENTS

| 2,966,860 | A | * | 1/1961 | Maynard | 418/152 |
| 3,213,800 | A | * | 10/1965 | McAlvay et al. | 418/132 |
| 3,306,225 | A | * | 2/1967 | Smith | 418/131 |
| 3,816,042 | A | * | 6/1974 | Menini | 418/132 |
| 5,178,528 | A | * | 1/1993 | Malfit | 418/72 |
| 5,232,356 | A | * | 8/1993 | Takeda et al. | 418/132 |
| 6,612,821 | B1 | | 9/2003 | Kuijpers et al. | |

FOREIGN PATENT DOCUMENTS

| DE | 691 10 614 T2 | 2/1996 |
| DE | 601 23 061 T2 | 3/2007 |
| JP | 2001-214870 A | 8/2001 |

OTHER PUBLICATIONS

U.S. Appl. No. 12/554,484, filed Sep. 4, 2009.
German Office Action with English Translation dated Jan. 29, 2013, and cover letter (fourteen (14) pages total).

* cited by examiner

*Primary Examiner* — Hoang Nguyen
(74) *Attorney, Agent, or Firm* — Crowell & Moring LLP

(57) ABSTRACT

A gear pump includes a gear to be driven by a drive shaft, a pair of side plate members adjoining side surfaces of the gear, respectively, to restrain leakage of an operating fluid, and a tip seal member or seal block for sealing the gear tip or circumference of the gear. At least one of the side plate members and the tip seal member are integral parts of a sealing member.

30 Claims, 23 Drawing Sheets

← MOVEMENT

MOVEMENT →

GEAR PUMP

CROSS-REFERENCE TO RELATED APPLICATION(S)

The present invention is related to an earlier filed U.S. patent application Ser. No. 12/554,484, filed Sep. 4, 2009 and entitled "Gear Pump".

BACKGROUND OF THE INVENTION

The present invention relates to gear pumps.

A published Japanese patent application 2001-214870 shows a gear pump including a seal block for sealing a tip of a gear, a pair of side plates for sealing the side surfaces of the gear, and a soft seal material interposed between butting surfaces of the seal block and at least one of the side plates.

SUMMARY OF THE INVENTION

Since the gear pump of the above-mentioned patent document requires many constituent parts, the number of the constituent parts tends to complicate the construction, deteriorate the ease in assembly process and increase the manufacturing cost. Moreover, the soft sealing material might degrade because of relative motion of a drive shaft and a follower shaft, and thereby deteriorate the sealing performance between the butting surfaces.

Therefore, it is an object of the present invention to provide a gear pump adequate for simplifying the construction, improving the ease in assembly process, reducing the production cost and/or improving the sealing effectiveness.

According to the present invention, a gear pump comprises a sealing member including, as integral part, one of side plates sealing the sides of a gear and a tip or circumference seal portion sealing the tip or circumference of the gear.

DETAILED DESCRIPTION OF THE INVENTION

FIG. 1~26 show a gear pump according to a first embodiment of the present invention. As shown in FIGS. 1~5, the gear pump 1 of the first embodiment is adapted to be used as an actuator for a brake pressure control system of a motor vehicle. Gear pump 1 in the illustrated example is a tandem gear pump. Gear pump 1 includes, as main components, a housing 2 and a pump assembly 3 enclosed in housing 2.

Figure 1:
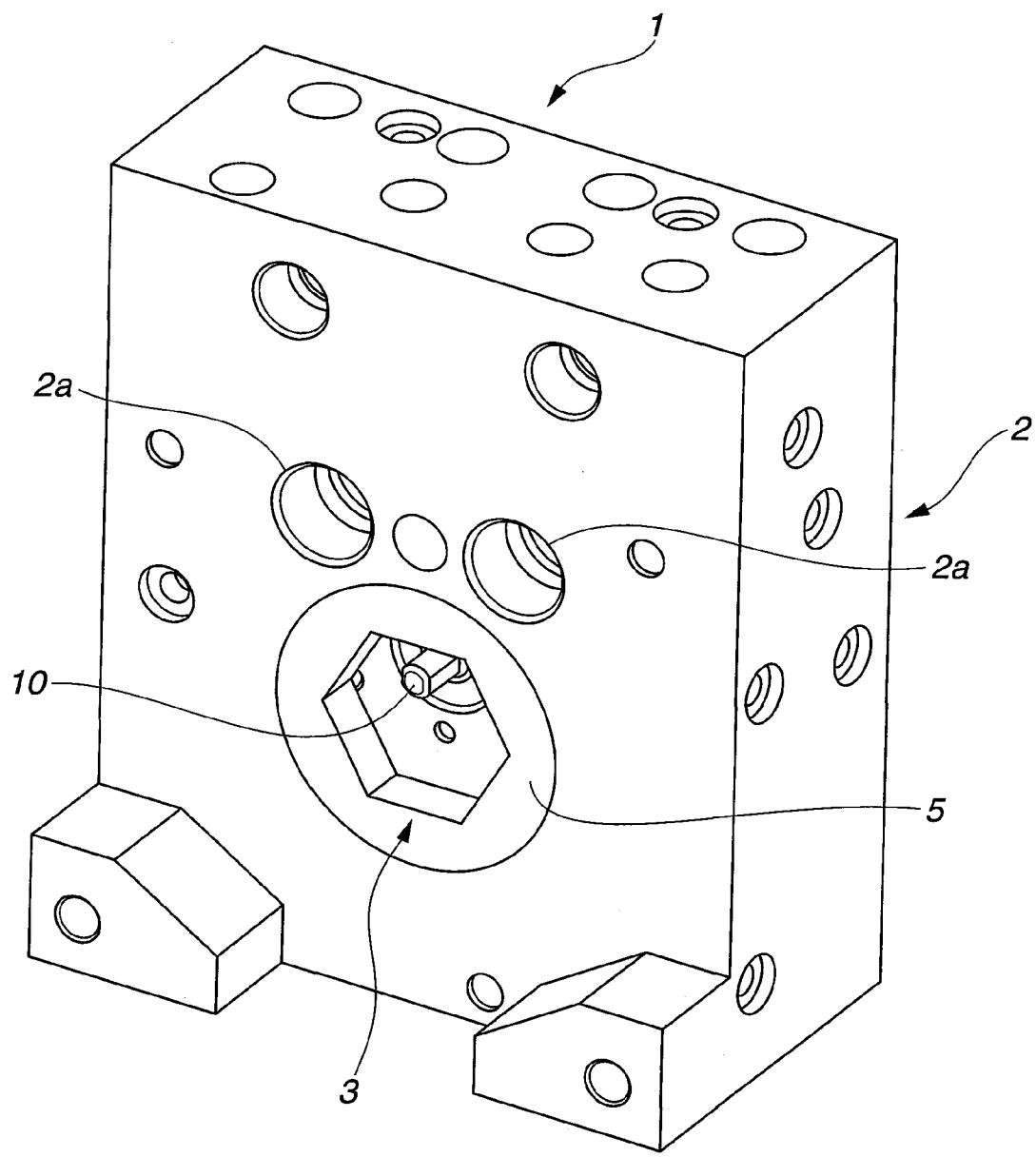
FIG. 1 is a perspective view showing a front side of a gear pump according to a first embodiment of the present invention.
Figure 2:
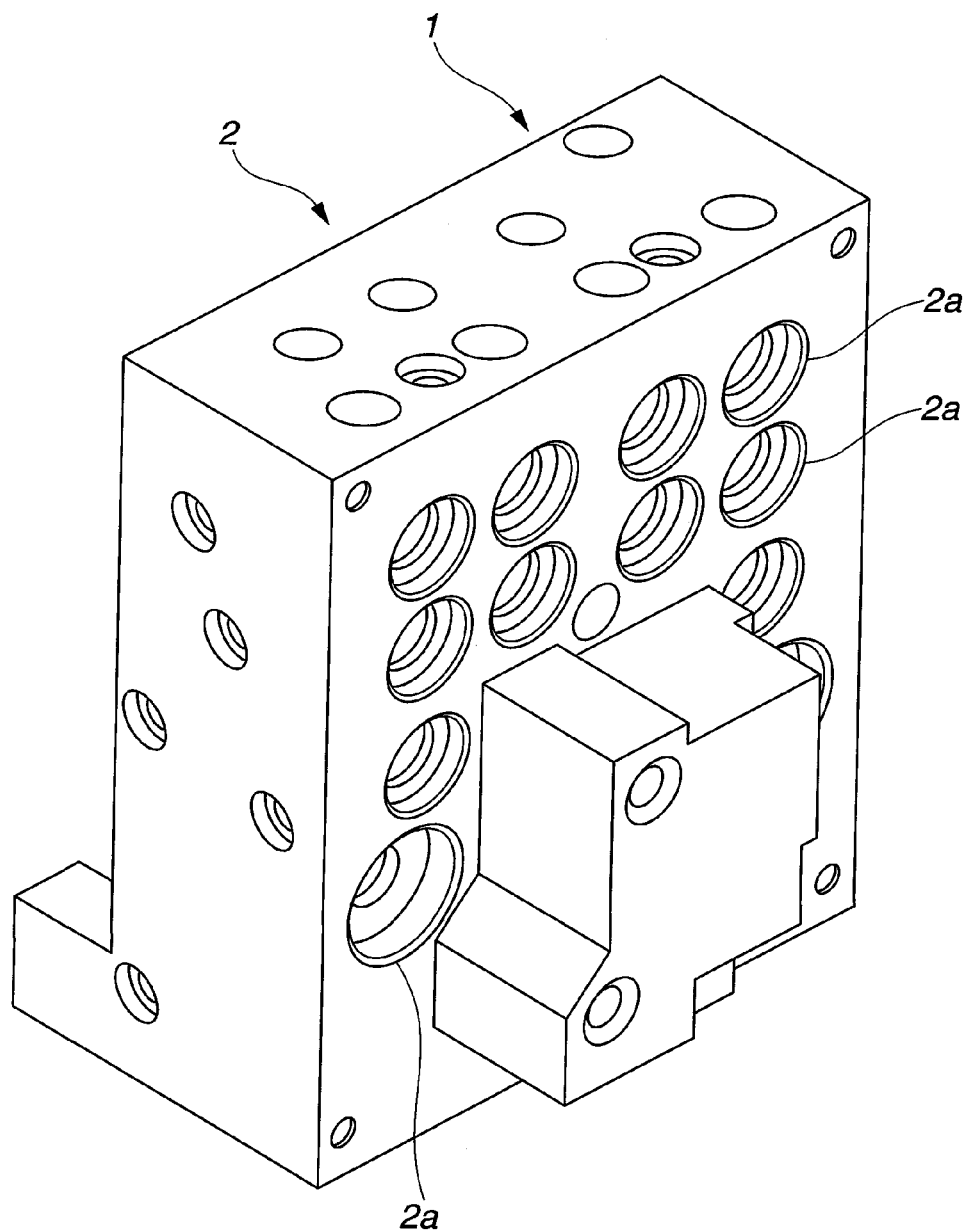
FIG. 2 is a perspective view showing a rear side of the gear pump of FIG. 1.
Figure 3:
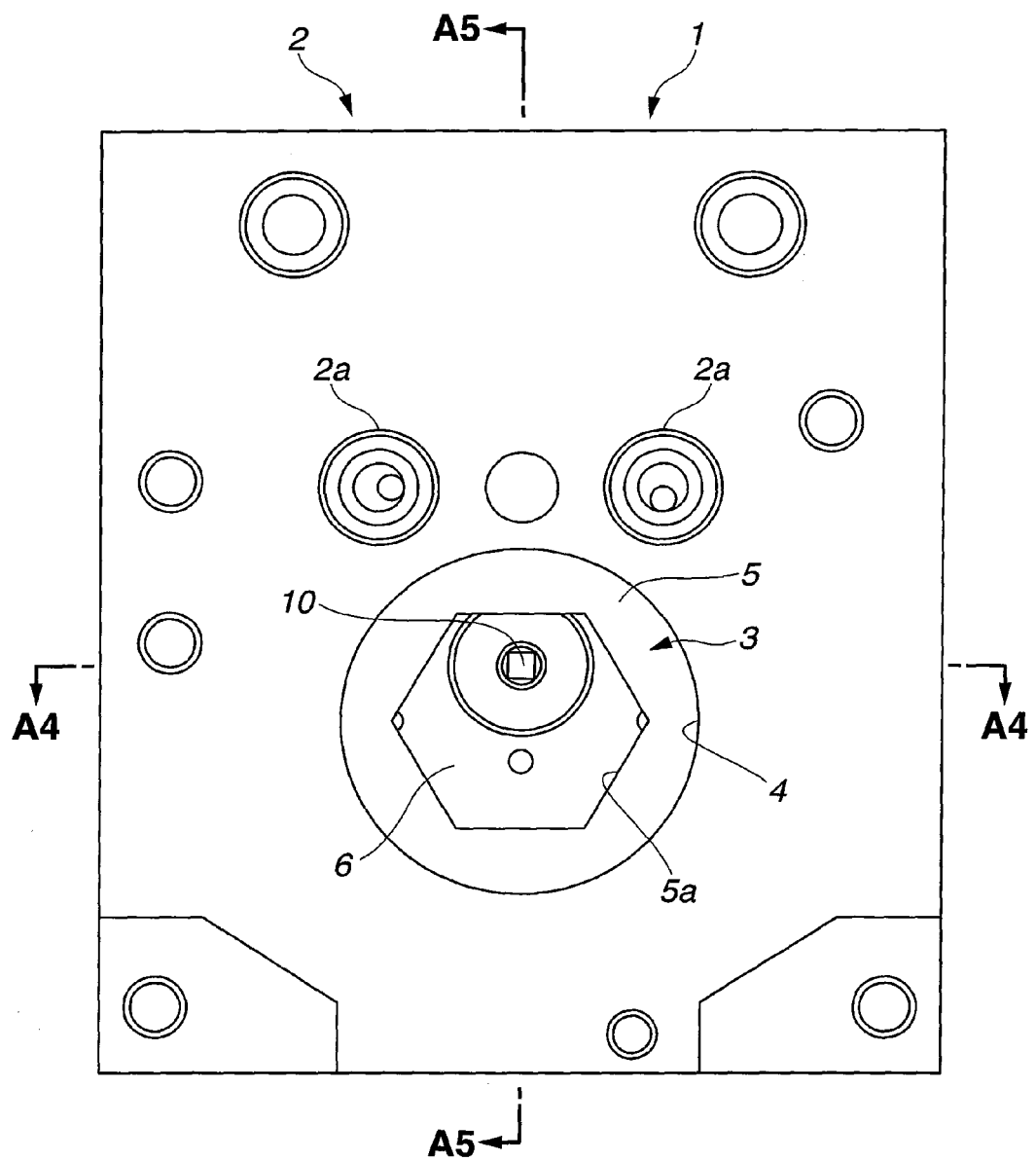
FIG. 3 is a front view of the gear pump of FIG. 1.
Figure 4:
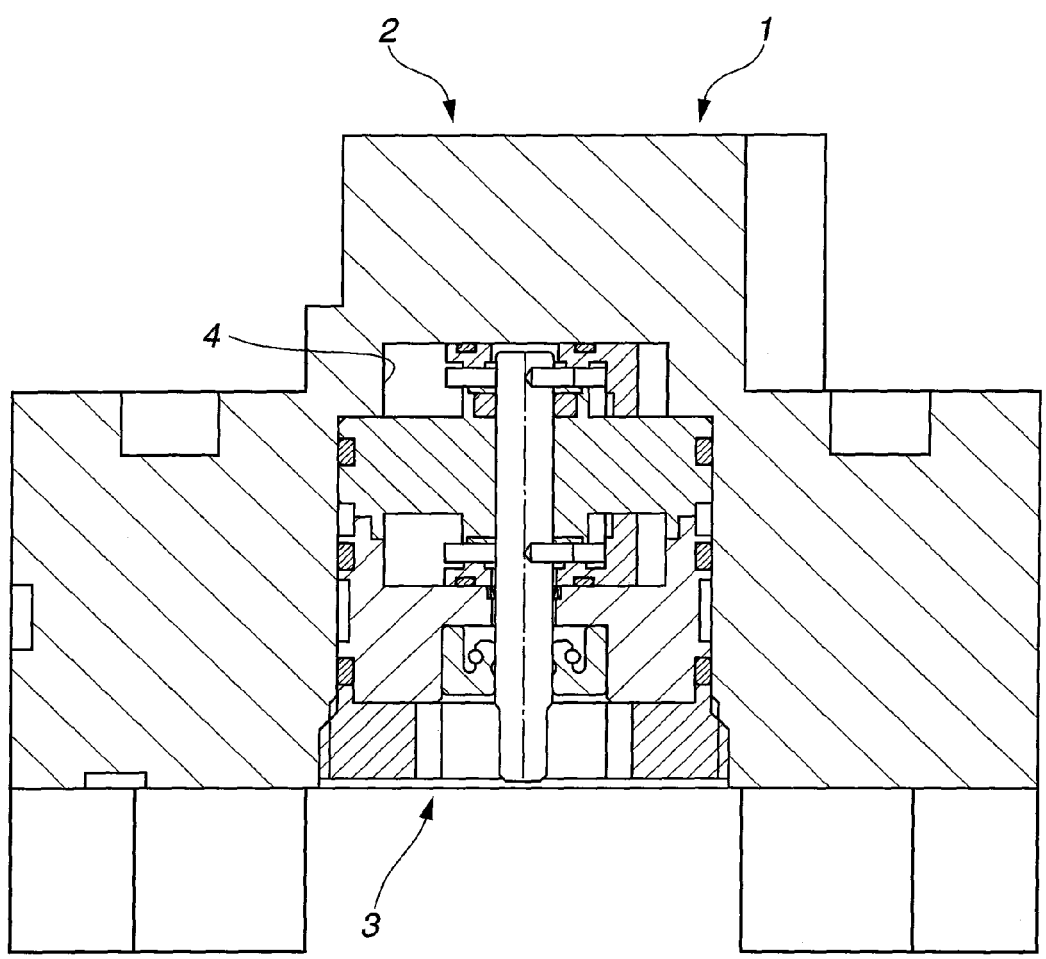
FIG. 4 is a sectional view taken across a line A4-A4 in FIG. 3.
Figure 5:
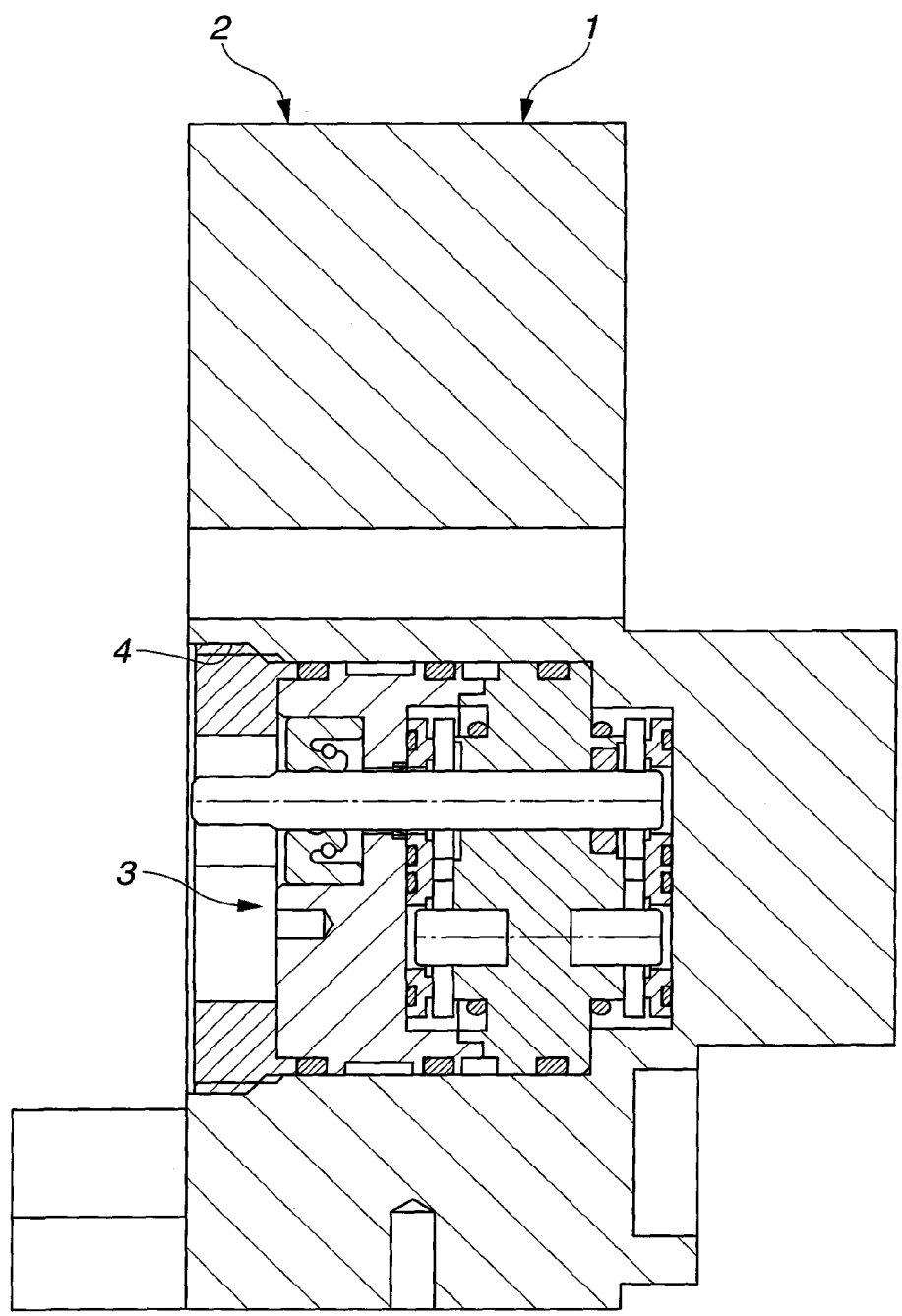
FIG. 5 is a sectional view taken across a line A5-A5 in FIG. 3.

Housing 2 includes a pump chamber 4 for receiving pump assembly 3. In this example, housing 2 is rectangular as viewed in FIG. 3, and approximately in the form of a rectangular parallelepiped as shown in FIGS. 1 and 2. Outside surfaces of housing 2 are formed with various mount holes 2a for mounting selector valves and sensors (not shown). Pump chamber 4 is opened approximately at the center of the front side of housing 2. Pump chamber 4 is cylindrical and approximately in the form of a stepped circular cylinder extending rearwards from an open end formed in the front surface of housing 2 to a bottom of pump chamber 4 on the rear side, and having an annular shoulder surface 4b facing forwards toward the open end and forming an annular step in pump chamber 4.

Figure 6:
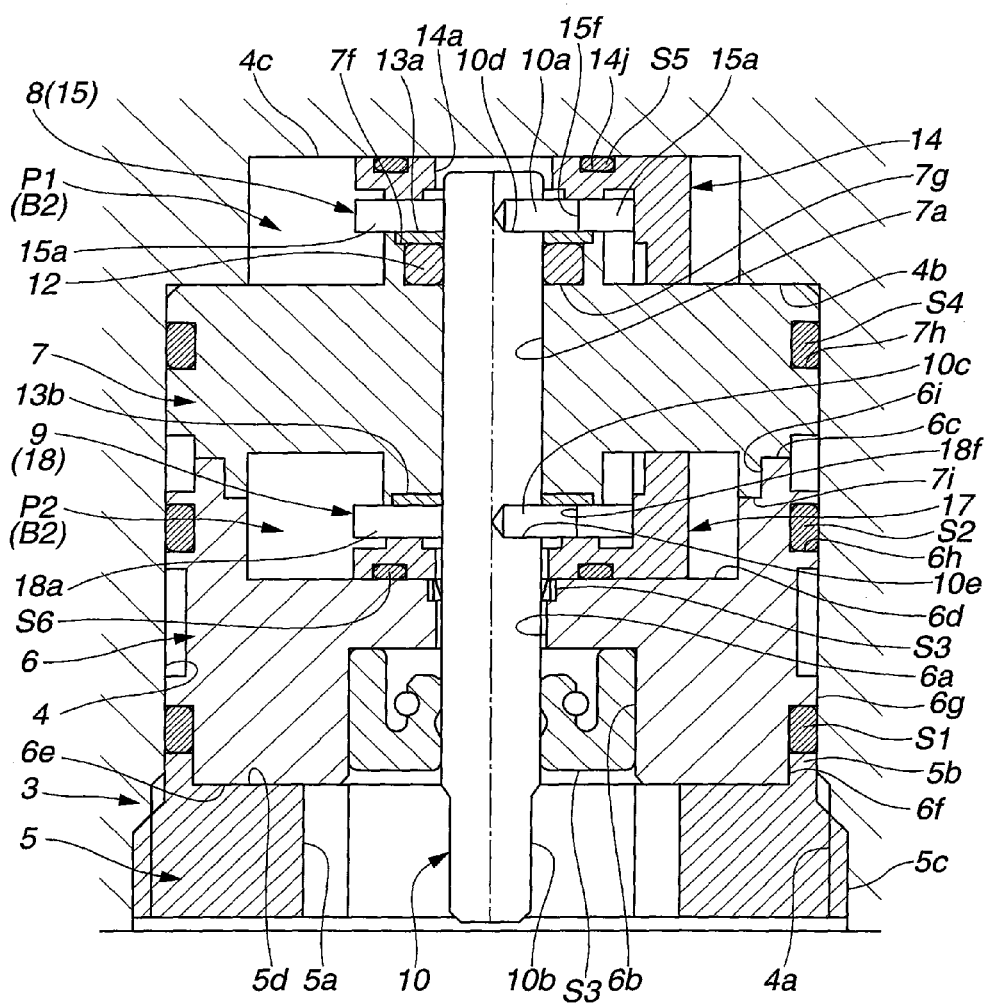
FIG. 6 is an enlarged view showing a pump assembly in the section of FIG. 4.
Figure 7:
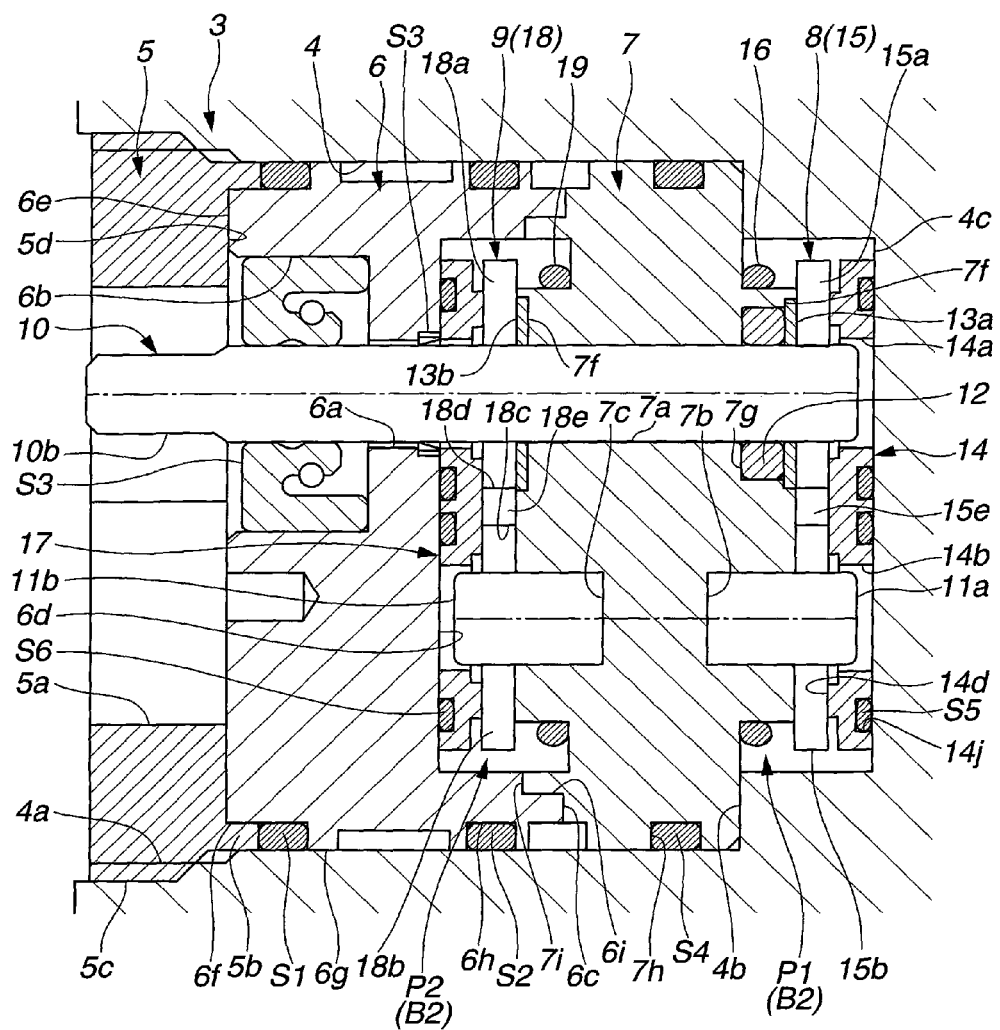
FIG. 7 is an enlarged view showing the pump assembly in the section of FIG. 5.

Pump assembly 3 extends from a front side adapted to be connected with a drive source which is a motor (not shown) in this example, to a rear side on which a first pump 8 is located. As shown in FIGS. 6 and 7, pump assembly 3 includes a cover member 6, an intermediate member 7 (which may be referred to as seal member or partition member), the first pump 8, a second pump 9, etc. It is possible to consider that pump assembly 3 further includes a plug member 5. (Pump assembly 3 may further include a drive shaft 10.) Plug member 5 is a circular plate-like member formed with a central hexagonal through hole 5a extending from a front surface to a rear surface 5d of plug member 5. The rear surface 5d is an abutment surface abutting on cover member 6. Plug member 5 includes an annular axial projection 5b surrounding the rear abutment surface 5d and projecting axially rearwards. Plug member 5 further includes an externally threaded portion 5c formed in the outer circumferential surface. With the externally threaded portion 5c, the plug member 5 is screwed into an internally threaded portion 4a formed in pump chamber 4 of housing 2.

Cover member 6 is a circular plate-like member including a front surface 6e which is an abutment surface abutting against plug member 5, and an annular recess 6f surrounding the front abutment surface 6e and forming a step. When plug member 5 is screwed in pump chamber 4, the rear abutment surface 5d of plug member 5 abuts against the front abutment surface 6e of cover member 6, and the annular projection 5b of plug member 5 fits over a front end portion of cover member 6 in the annular recess 6f of cover member 6.

Cover member 6 further includes a circumferential radial projection 6g projecting radially outwards to have an outside diameter approximately equal to the inside diameter of pump chamber 4, and the outside diameter of the annular projection 5b of plug member 5, so that the projection 6g and 5b are fit in the inside cylindrical surface of pump chamber 4. Cover member 6 further includes an annular seal groove 6h located on the rear side of projection 6g. A first annular seal S1 is disposed axially between annular axial projection 5b of plug member 5 and radial projection 6g of cover member 6, to seal a clearance radially between the outside surface of cover member 6 and the inside surface of pump chamber 4. A second annular seal S2 is disposed in the seal groove 6h to seal a clearance between cover member and the inside surface of pump chamber 4. First and second seals S1 and S2 are disposed at two separate positions spaced axially in the front and rear (axial) direction.

A stepped through hole 6b is formed at an eccentric position of cover member 6. Stepped through hole 6b includes a larger diameter (front) portion and a smaller diameter (rear) portion having an inside diameter smaller than the inside diameter of the large diameter portion. A drive shaft 10 is inserted in this stepped through hole 6b with a clearance 6a in the smaller diameter portion. Annular seal members S3 are disposed, respectively, in the larger diameter portion and the smaller diameter portion of stepped through hole 6b to seal a clearance around drive shaft 10. Cover member 6 further includes a cylindrical recessed portion 6d recessed from the rear end of cover member 6 toward the front end, and an annular axial projection 6c surrounding the recessed portion 6d, and projecting axially rearwards. In annular axial projection 6c, there is formed an annular stepped portion 6i defined by an annular shoulder surface facing rearwards.

Figure 12:
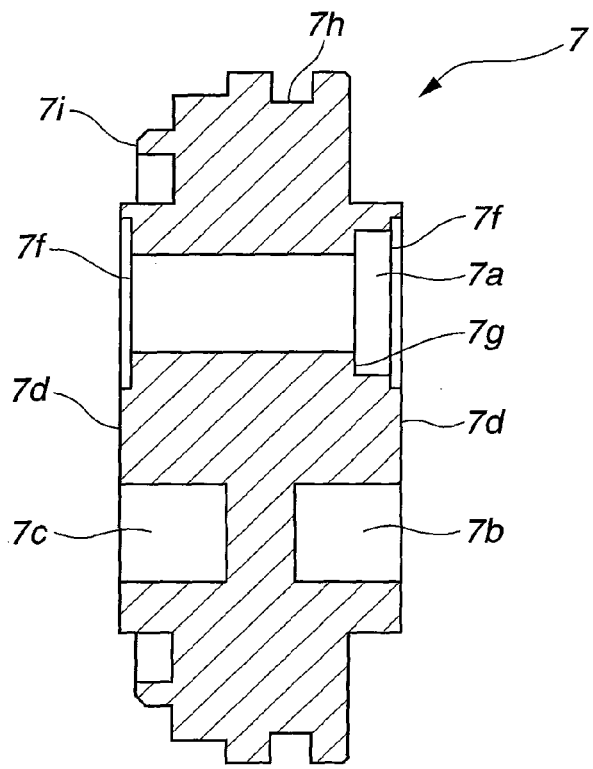
FIG. 12 is sectional view taken across a line A12-A12 shown in FIG. 11.
Figure 13:
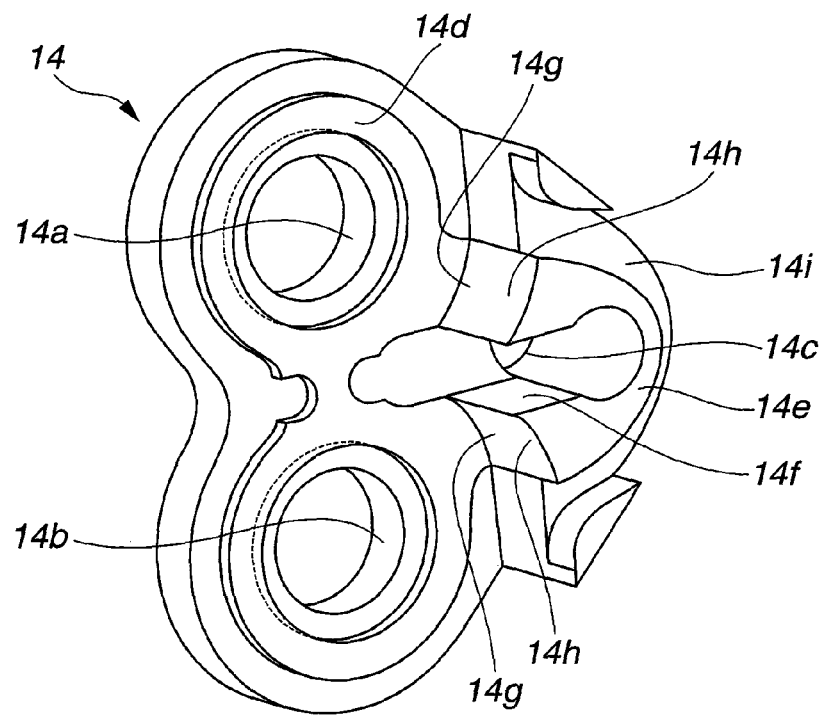
FIG. 13 is a perspective view showing the front side of a first side plate shown in FIGS. 6 and 7.
Figure 14:
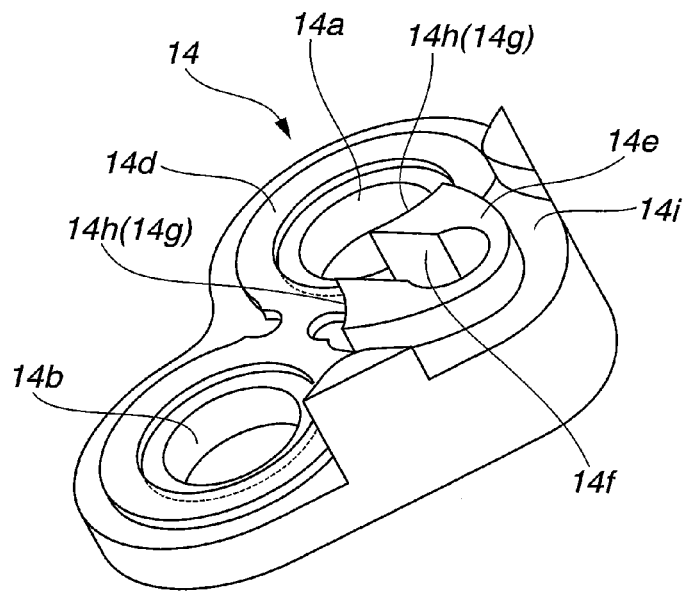
FIG. 14 is a perspective view showing the front side of the first side plate.
Figure 15:
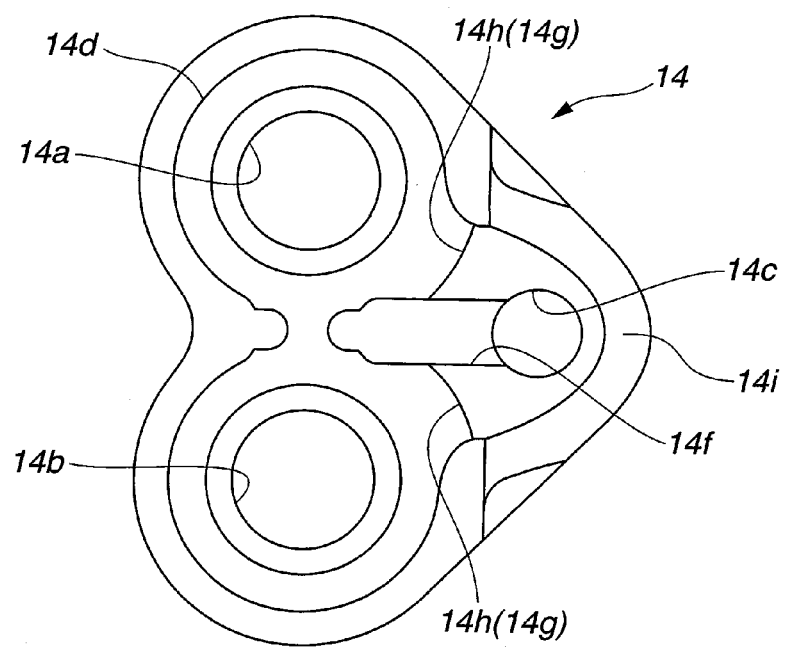
FIG. 15 is a front view showing the first side plate.

Intermediate member (or seal member or partition member) 7 is a circular plate-like member as shown in FIGS. 8~12. Intermediate member 7 includes a through shaft hole 7a and two insertion holes 7b and 7c. Insertion holes 7b and 7c are located on the lower side of through hole 7a as viewed in FIGS. 7~12, and aligned in a line extending in parallel to a center line of through shaft hole 7a as best shown in FIG. 7. Through shaft hole 7a is a circular hole having a circular cross section, and extending through seal member 7 axially in the front and rear direction. Insertion holes 7b and 7c are also circular holes each having a circular cross section. Insertion holes 7b and 7c are opened, respectively, from the front and rear side surfaces of intermediate member 7, and extended toward each other in the thickness direction up to a bottom wall separating insertion holes 7b and 7c, as shown in FIG. 12 and FIG. 7. On each of the front and rear sides, intermediate member 7 includes a side seal portion 7d surrounding the through hole 7a and insertion hole 7b or 7c, and projecting axially around the corresponding holes so as to fringe the holes. Each of the side seal portions 7d includes a pair of engagement projections 7e projecting to one side.

Figure 8:
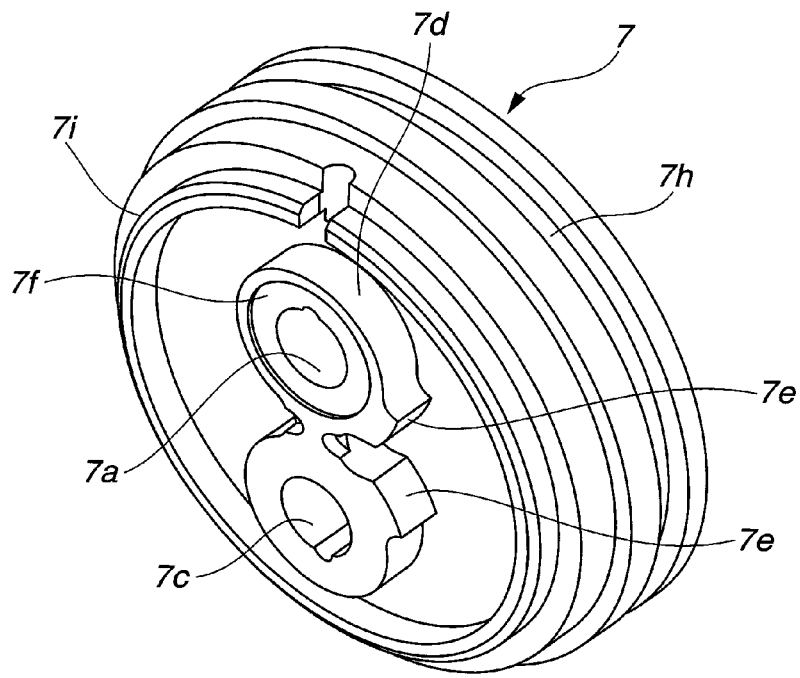
FIG. 8 is a perspective view showing the front side of an intermediate member shown in FIGS. 6 and 7.
Figure 9:
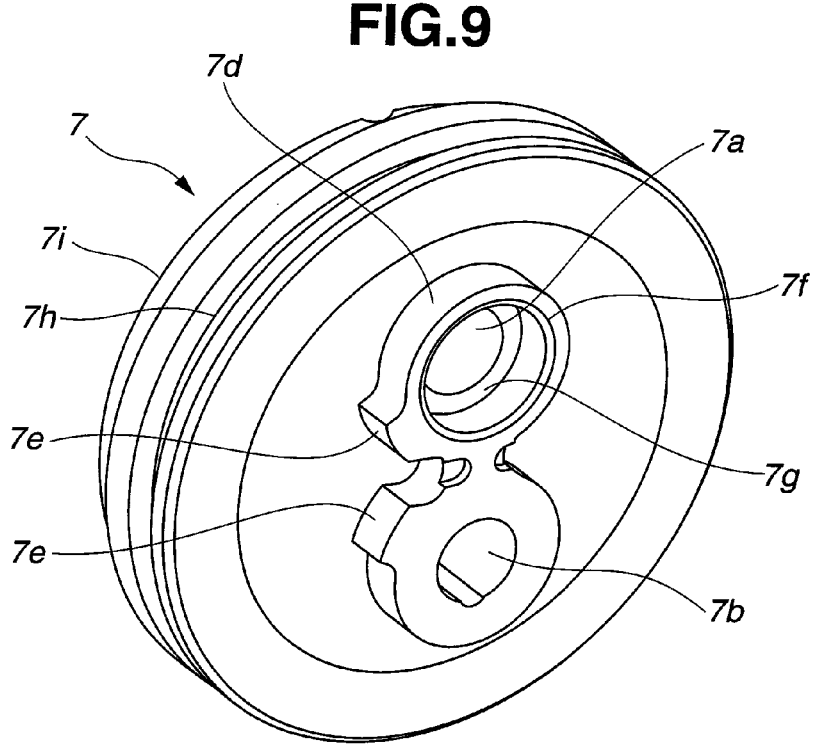
FIG. 9 is a perspective view showing the rear side of the intermediate member (or seal member).
Figure 10:
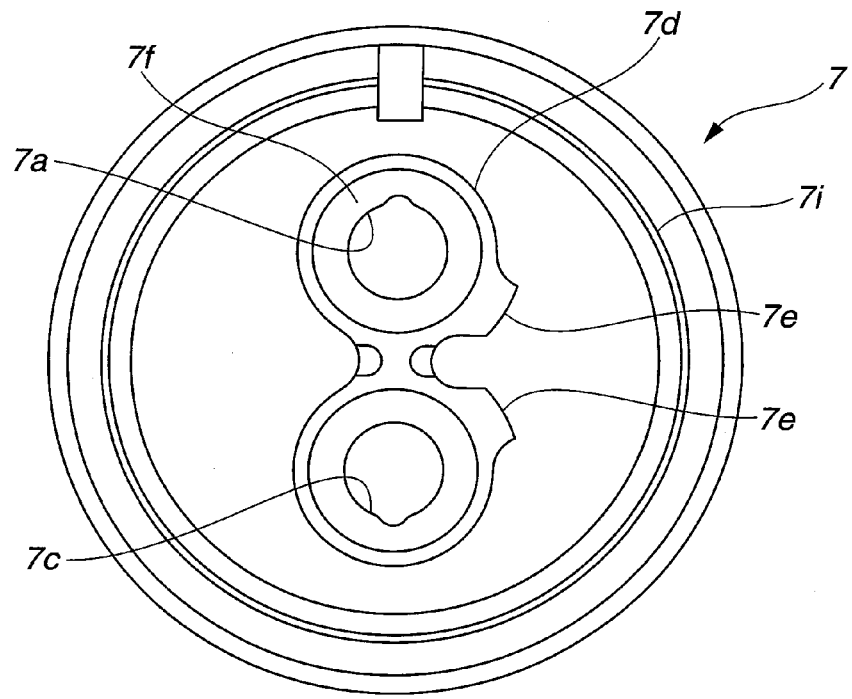
FIG. 10 is a front view of the intermediate member.
Figure 11:
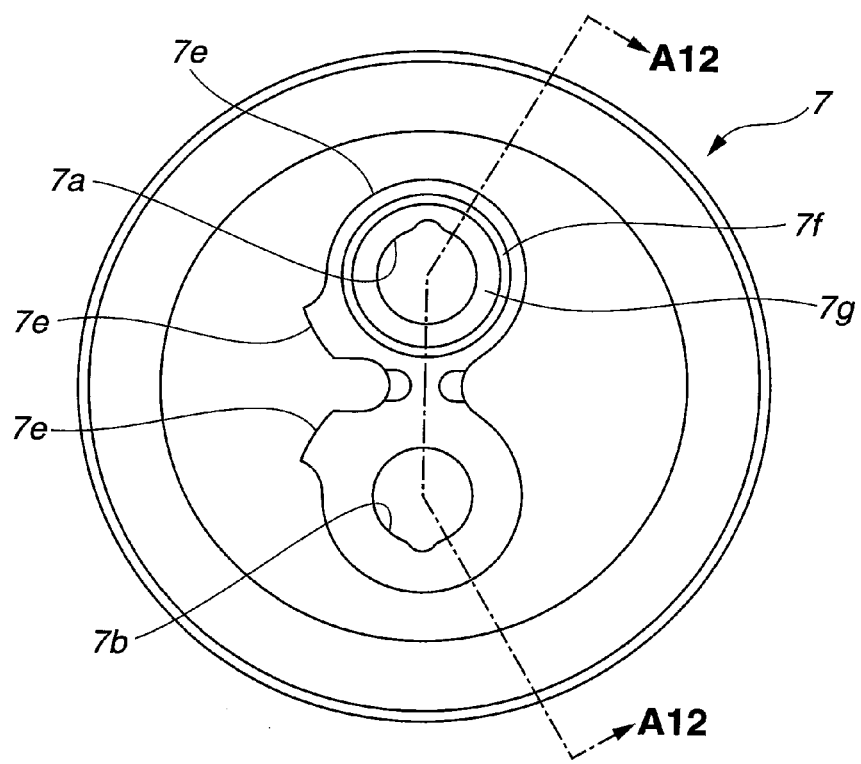
FIG. 11 is a rear view of the intermediate member.

The side seal portion 7d on each of the front and rear sides includes a ring receiving annular recess 7f recessed in the thickness direction, around through hole 7a coaxially, as shown in FIGS. 8 and 9. Furthermore, on the rear side, there is formed a smaller diameter ring receiving annular recess 7g recessed deeper continuously in the thickness direction from the annular recess 7f of the rear side, coaxially around through hole 7a, as shown in FIG. 9. Moreover, intermediate member 7 includes an annular seal groove 7h recessed radially inwards from the outer circumferential surface of intermediate member 7, and a front annular axial projection 7i projecting axially forwards from the front side.

Intermediate member 7 is pushed rearwards through cover member 6 by the axial force produced by plug member 5 when screwed into pump chamber 4, as shown in FIGS. 6 and 7. As a result, the annular front projection 7i is fit in the step portion 6i formed on the radial inner side of annular rear projection 6c of cover member 6, and an outer region of the rear side surface of intermediate member 7 abuts on the forwardly facing annular shoulder surface 4b formed in pump chamber 4, so that seal member 7 is positioned reliably at a predetermined position. Drive shaft 10 is received, and supported rotatably in the through shaft hole 7a of intermediate member 7. Support shafts 11a and 11b are inserted and fixed, respectively, in insertion holes 7b and 7c.

An annular rotation seal member (or shaft seal member or shaft sealing element) 12 (such as X ring) is disposed in the rear side annular seal receiving recess 7g to provide a sealing barrier around drive shaft 10 for sealing off a later-mentioned first pump chamber P1. Furthermore, a first seal ring 13a is disposed in annular seal receiving recess 7f on the rear side in such a state as to close the annular recess 7g of rotation seal member 12. A second seal ring 13b is disposed in annular recess 7f on the front side. Seal rings 13a and 13b are made of material harder and better in durability than seal member 7. First and second seal rings 13a and 13b can serve as first and second stopper members. In this example, seal rings 13a and 13b may be metallic members. An annular seal S4 is disposed in annular seal groove 7h of intermediate member 7 and arranged to contact tightly with the inside circumferential surface of pump chamber 4 to secure a sealing separation between first and second pump chambers P1 and P2.

The first pump chamber P1 is defined, as a closed space, between intermediate member 7 and the bottom of pump chamber 4, in a recessed portion 4c recessed axially rearwards from the shoulder surface 4b of housing 2. First pump 8 is provided in first pump chamber P1. The second pump chamber P2 is defined, as a closed space, between the bottom of recessed portion 6d of cover member 6 and intermediate member 7. Second pump 9 is provided in second pump chamber P2.

A first gear (or gearing) 15 is disposed in first pump chamber P1, between intermediate member 7 and a first side plate 14 so that the front and rear sides and the tooth tops are sealed by these members. As shown in FIGS. 13-17, the first side plate 14 is a member made of a resin, and shaped like a (rounded) triangle as viewed in the front view. First side plate 14 includes three through holes 14a, 14b and 14c formed, respectively, in three corners of triangular first side plate 14. First side plate 14 further includes a side seal portion 14d surrounding the through holes 14a and 14b on the front side, and projecting axially forwards.

Figure 16:
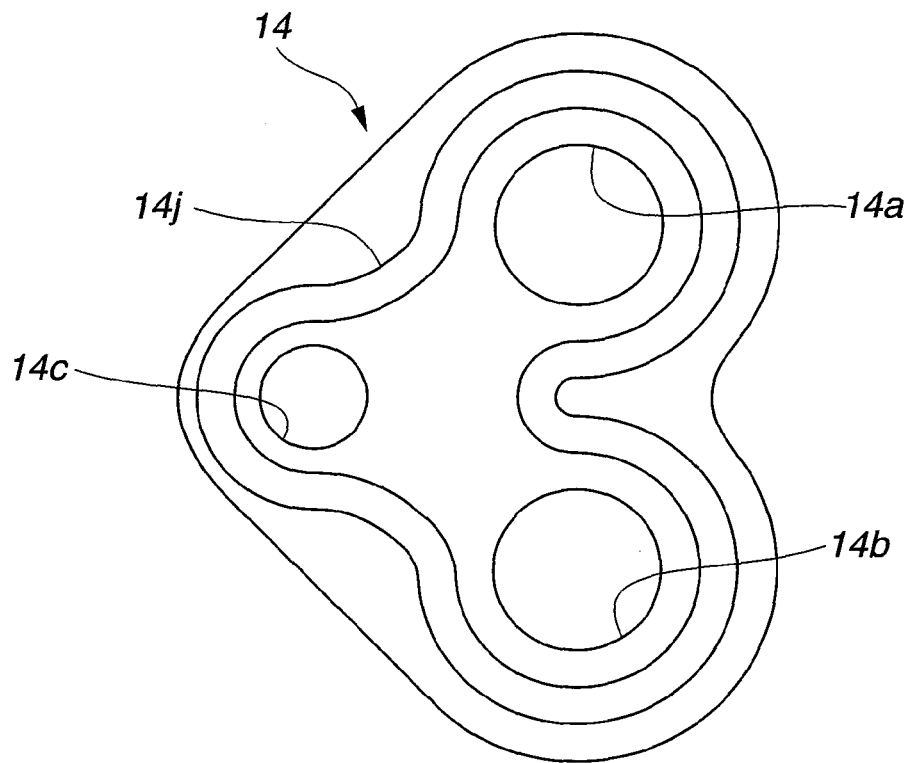
FIG. 16 is a rear view of the first side plate.
Figure 17:
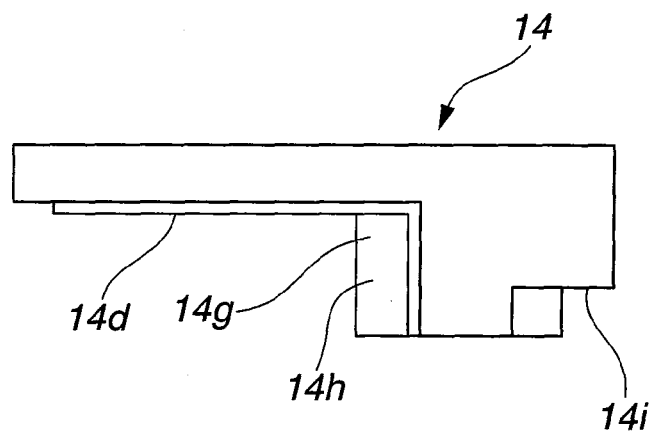
FIG. 17 is a top view of the first side plate.

A seal block 14e is formed in first side plate 14. Seal block 14e is shaped like a triangle, and projects axially forwards from the front surface of first side plate 14. Seal block 14e of first side plate 14 includes: a passage portion 14f forming an open portion extending continuously from the through hole 14c toward the center of first side plate 14; a pair of tooth top seal portions (or tip seal portions) 14g which are formed on both sides of the passage portion 14f, which are continuous with a part of the side seal portion 14d, and which are in the form of a curved surface; and engagement portions 14h located on the front side of the respective tooth top seal portions 14g. Seal block 14e further includes a curved groove 14i which is recessed rearwards and which extends around the through hole 14c and tooth top seal portions 14g. In the rear side, as shown in FIG. 16, the first side seal plate 14 is formed with a seal groove 14j extending curvedly so as to describe a triangle, and surrounding the three through holes 14a, 14b and 14c.

As shown in FIG. 7, drive shaft 10 is received rotatably with a predetermined radial clearance in the through hole 14a of first side plate 14, and the rear side support shaft 11a is received in the through hole 14b with a predetermined radial clearance. A seal S5 is received in the rear side seal groove 14j, and thereby arranged to seal off the first pump chamber P1 from a lower pressure region.

Figure 18:
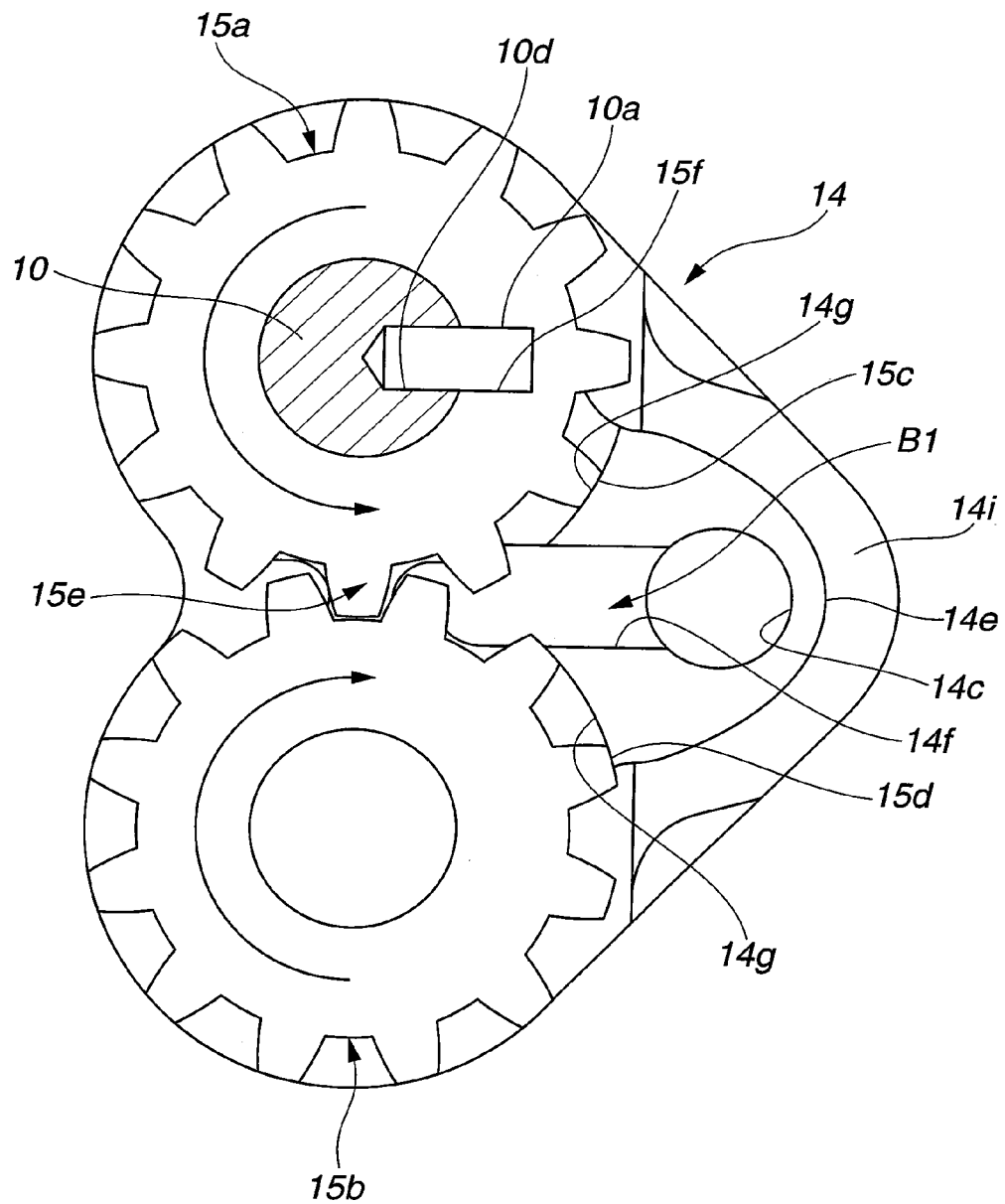
FIG. 18 is a view showing the arrangement of a first gear and the first side plate shown in FIGS. 6 and 7, used for illustrating operations of the gear pump according to the first embodiment.

First gear (or gearing) 15 is composed of a driving gear (or toothed wheel serving as a pump element) 15a mounted on drive shaft 10, and a driven gear (or toothed wheel serving as a further pump element) 15b mounted on support shaft 11a. The teeth 15c and 15d of driving and driven gears 15a and 15b are engaged with each other in an engagement region 15e, as best shown in FIG. 18. As shown in FIGS. 6 and 18, drive shaft 10 is formed with a radial hole or recessed portion 10d recessed radially inwards at the position supporting the driving gear 15a. A radially extending driving pin 10a (serving as a first or second drive projection) is inserted in this radial hole 10d. In this example, driving pin 10a is cylindrical. Driving pin 10a may be fixed by press fitting or may be merely inserted in radial hole 10d.

Driving pin 10a is engaged in a recess (drive recess) 15f (serving as a first or second drive recess) formed in the inside circumference of driving gear 15a in the form of a cutout extending through the driving gear 15a in the widthwise direction of driving gear 15a. Drive shaft 10 includes a forward end portion 10b adapted to be connected with the drive source which, in this example, is a motor (not shown) (as shown in FIG. 7). This forward end portion 10b is shaped to have a noncircular cross section such as a square cross section, and arranged to serve as a portion to be connected with the rotation shaft of the motor. Thus, drive shaft 10 is adapted to be driven by the rotation of the motor.

Thus, driving pin 10a is arranged to prevent the rotation of driving gear 15a relative to drive shaft 10, and to cause the driving gear 15a to rotate as a unit with drive shaft 10. When drive shaft 10 is driven, the driving gear 15a rotates in the same direction as drive shaft 10, and the driven gear 15b is rotated in the opposite direction by driving gear 15a.

Figure 19:
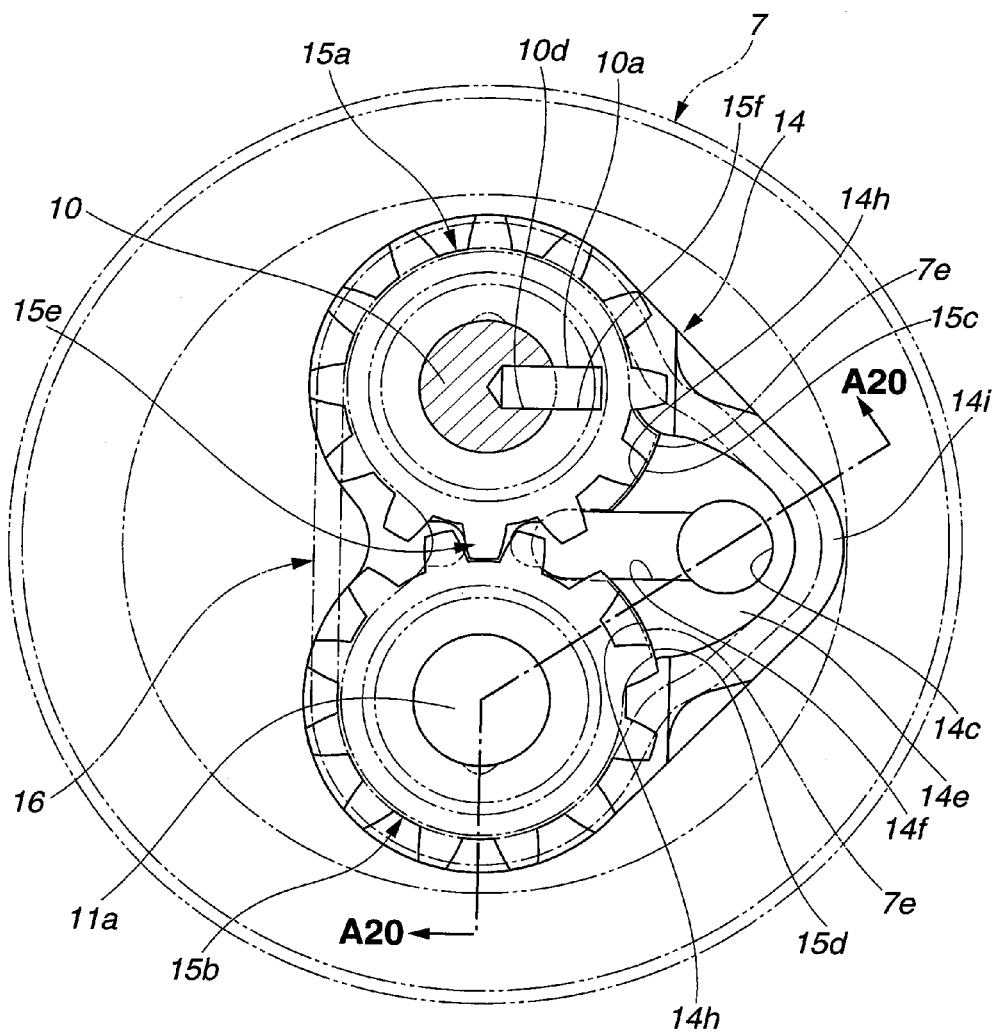
FIG. 19 is a view showing the arrangement of the first gear, the first side plate, the intermediate member (shown by a two dot chain line), and a holding member (shown by a one dot chain line).
Figure 20:
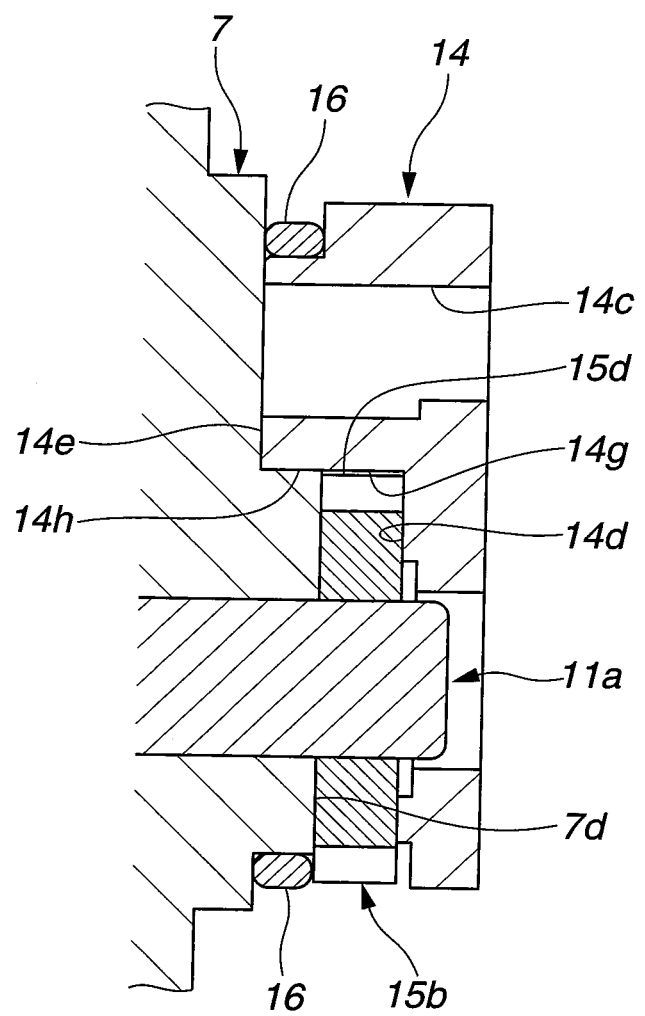
FIG. 20 is a sectional view taken across a line A20-A20 shown in FIG. 19.
Figure 21:
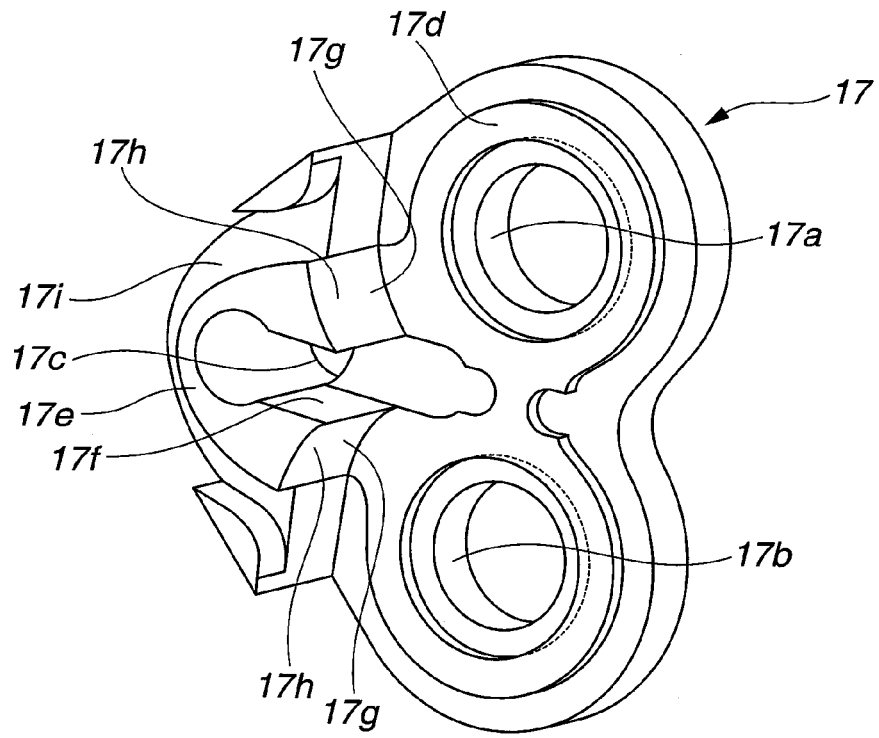
FIG. 21 is a perspective view showing the rear side of a second side plate shown in FIGS. 6 and 7.
Figure 22:
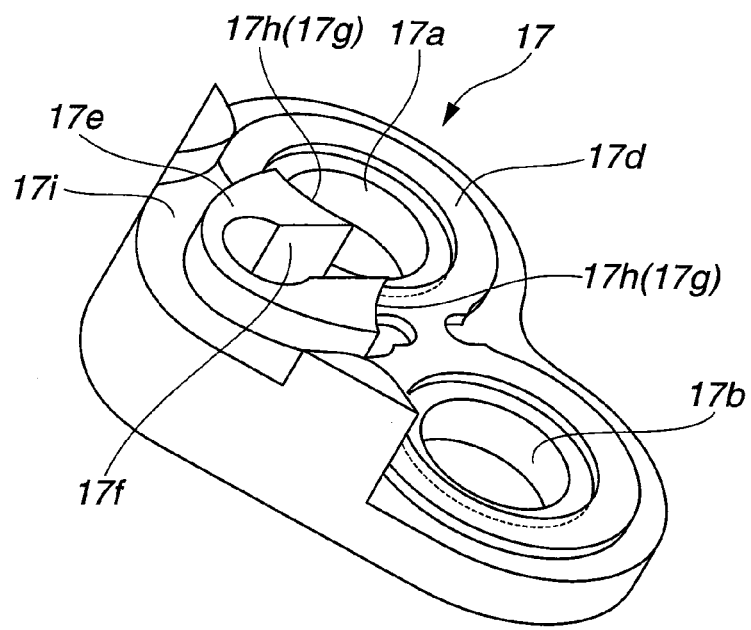
FIG. 22 is a perspective view showing the rear side of the second side plate.
Figure 23:
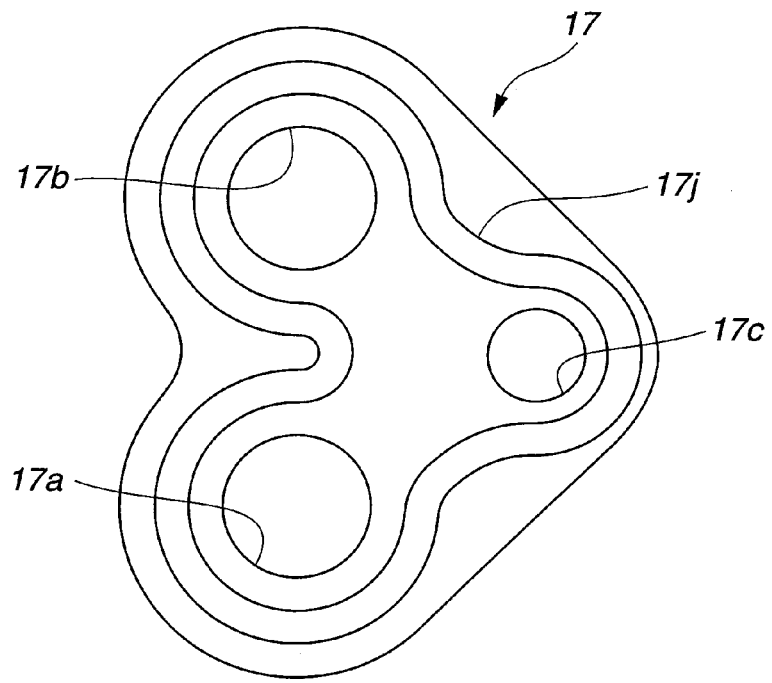
FIG. 23 is a front view of the second side plate.
Figure 24:
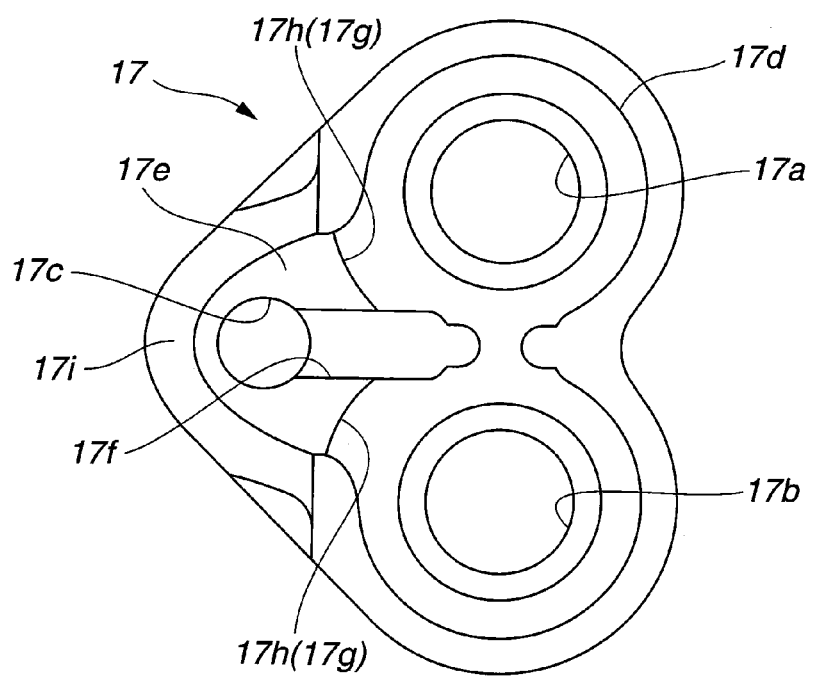
FIG. 24 is a rear view of the second side plate.
Figure 25:
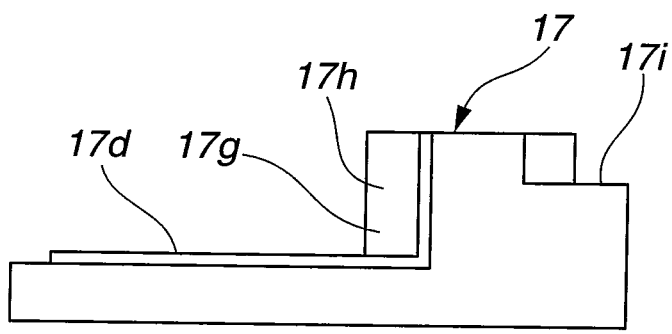
FIG. 25 is a top view of the second side plate.

As shown in FIG. 18, the tops of teeth (gear tip) 15c and 15d of driving and driven gears 15a and 15b are shaped and adapted to contact liquid-tightly and slidably with the respective tooth top seal portions (or tip seal portions) 14g of seal block 14e of first side plate 14. As shown in FIG. 19, the first and second engagement projections 7e on the rear side of intermediate member 7 are engaged, respectively, with the engagement portions 14h of seal block 14e in such a tight manner that the curved concave surfaces of engagement portions 14h are in contact with the curved convex surfaces of the respective engagement projections 7e. With this arrangement, the tops of teeth (gear tips) 15c and 15d of driving and driven gears 15a and 15b are sealed, with side seal portion 14d of first side plate 14. Furthermore, a holding member 16 extending so as to describe a triangle is fit in groove 14i on the outer circumference of seal block 14e and on the corresponding side seal portion 7d of seal member 7 (as shown in FIG. 7).

Pump chamber 4 of housing 2 is provided with an inlet port (not shown) communicating with the through hole 14c of first side plate 14, and an outlet port (not shown) communicating with first pump chamber P1.

Second pump 9 is disposed on the front side of intermediate member 7 so that first and second pumps 8 and 9 are symmetrical with respect to a cross section of intermediate member 7 at the middle between pumps 8 and 9. A second gear (or gearing) 18 of second pump 9 is sealed between intermediate member 7 on the rear side and a second side plate 17 on the front side. As shown in FIGS. 21~25, second side plate 17 includes through holes 17a, 17b and 17c, a side seal portion 17d, a seal block 17e, a passage portion 17f, tooth top seal portions 17g, engagement portions 17h, a groove 17i and a seal groove 17j, like first side plate 14. Furthermore, a holding member 16 extending so as to describe a triangle is fit in groove 17i on the outer circumference of seal block 17e and on the corresponding side seal portion 7d of seal member 7 (as shown in FIG. 7).

As shown in FIG. 7, drive shaft 10 is received rotatably with a predetermined radial clearance in the through hole 17a of second side plate 17, and the front side support shaft 11b is received in the through hole 17b with a predetermined radial clearance. A seal S6 is received in the front side seal groove 17j, and thereby arranged to seal off the second pump chamber P2.

Second gear (or gearing) 18 is composed of a driving gear (toothed wheel serving as a pump element) 18a mounted on drive shaft 10, and a driven gear (toothed wheel serving as a further pump element) 18b mounted on the support shaft 11b, like first gear 15. The teeth 18c and 18d of driving and driven gears 18a and 18b are engaged with each other in an engagement region 18e.

As shown in FIG. 6, drive shaft 10 is formed with a radial hole or recess recessed radially inwards at the position supporting the driving gear 18a. A radially extending drive pin 10c is inserted in this radial hole 10e. In this example, drive pin 10c is a cylindrical pin projecting radially outwards in a radial direction from the center axis of drive shaft 10. Drive pin 10c may be fixed by press fitting or may be merely inserted in radial hole 10e. Drive pin 10c is engaged in a drive recess 18f formed in the inside circumference of driving gear 18a. Drive pin 10c can serve as a drive projection. In this example, drive recess 18f is in the form of a cutout or notch extending through the driving gear 18a in the widthwise direction of driving gear 18a.

Thus, drive pin 10c is arranged to prevent the rotation of driving gear 18a relative to drive shaft 10, and to cause the driving gear 18a to rotate as a unit with drive shaft 10. When drive shaft 10 is driven, the driving gear 18a rotates in the same direction as drive shaft 10, and the driven gear 18b is rotated in the opposite direction by driving gear 18a.

In second pump 9, pump chamber 4 of housing 2 is provided with an inlet port (not shown) communicating with the through hole 17c of second side plate 17 through an oil passage formed in cover member 6, and an outlet port (not shown) communicating with second pump chamber P2 through an oil passage formed in cover member 6. In the other respects, the second pump 9 is constructed in the same manner as first pump 8.

Figure 26A:
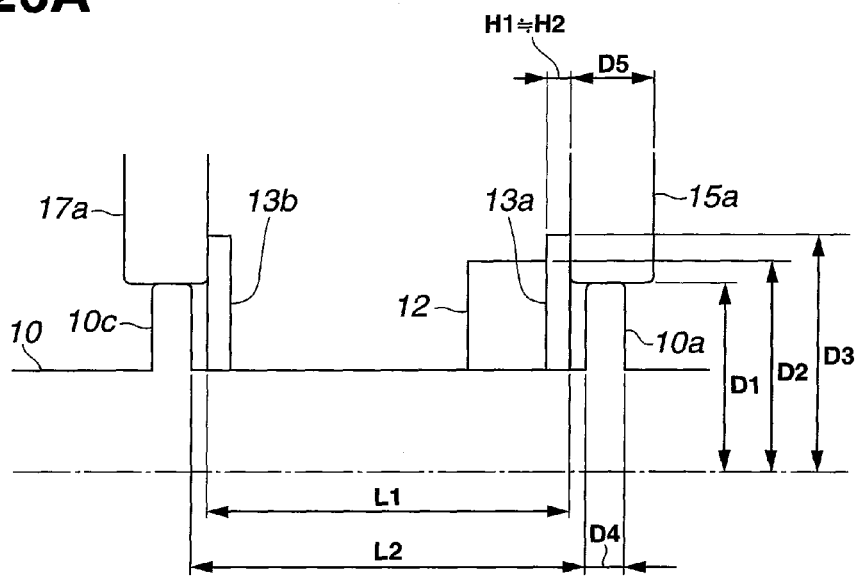
FIGS. 26A, 26B and 26C are schematic views for illustrating dimensions of a connecting section around a drive shaft in the gear pump shown in FIGS. 1~7, and for illustrating relative positioning with drive pins of the connecting section.
Figure 26B:
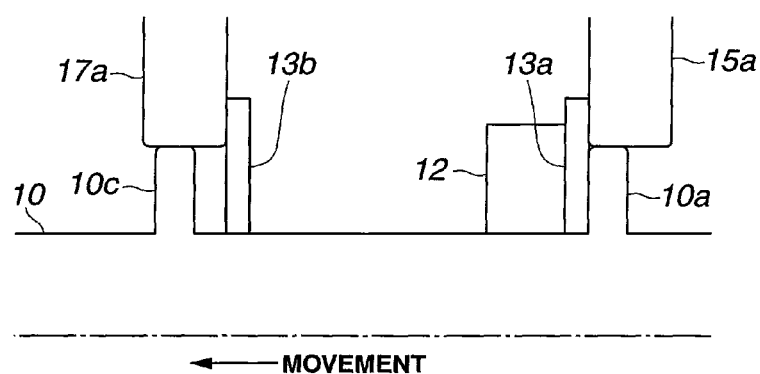
Figure 26C:
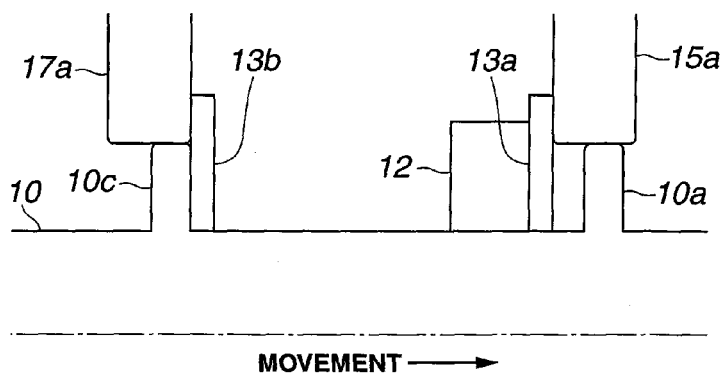

Dimensions in the vicinity of drive shaft 10 are determined in the following manner, as illustrated in FIGS. 26A, 26B and 26C. In FIG. 26A, D1 is a (radial) distance from the center of drive shaft 10 to the radial outer end of driving pin 10a (or driving pin 10c) extending radially outwards, D2 is the radius of the annular rotation seal member 12, and D3 is the radius of first seal ring 13a (or second seal ring 13b). As schematically shown in FIG. 26A, these dimensions D1, D2 and D3 are determined so that D1<D2<D3. Generally, at least one of the following three conditions is met. First, drive projection (10a, 10c) is so sized that the drive projection does not project radially outwards beyond the stopper member (13a, 13b), and the stopper member extends radially outwards beyond the drive projection. Second, the stopper member (13a, 13b) is greater in cross sectional size than rotation seal member 12. Third, the rotation seal member 12 extends radially outwards beyond the drive projection (10a, 10c).

The diameter D4 of driving pin 10a (or driving pin 10c) is smaller than or equal to the thickness D5 of driving gear 15a (or driving gear 18a). Generally, the drive projection (10a, 10c) is thinner in axial dimension than the driving gear (15a, 18a) so that the drive projection does not project laterally or axially beyond the driving gear.

The (axial) depth H1 of each ring receiving portion 7f is substantially equal to the (axial) thickness H2 of first seal ring 13a (or second seal ring 13b).

The spacing L2 between the driving pins 10a and 10c (distance between the confronting closer (or inner) sides of driving pins 10a and 10c) is greater than the distance L1 between the far (or outer) sides of the seal rings 13a and 13b.

The diameter of the though hole 14a or 17a of each of the side plates 14 and 17 is greater than the diameter of drive shaft 10. The diameter of each of through holes 14b and 17b is greater than the diameter of support shaft 11a or 11b. Drive shaft 10 and support shafts 11a and 11b are inserted in the respective holes 14a, 17a, 14b and 17b of side plates 14 and 17 with slight clearance.

The thus-constructed gear pump 1 is assembled in the following manner. First, rotation seal member 12 is fit in seal receiving portion 7g of intermediate member (or seal member) 7 preliminarily equipped with seal S4, and thereby fixed provisionally.

Then, drive shaft 10 is inserted through the through hole 7a of intermediate member 7, and thereafter support shafts 11a and 11b are inserted, respectively, in insertion holes 7b and 7c. Thus, a subassembly of intermediate member 7, drive shaft 10 and support shaft 11a and 11b is formed.

Then, seal rings 13a and 13b are inserted, respectively, in ring receiving portions 7f of intermediate member 7. In this case, the rotation seal member 12 is pressed by first seal ring 13a, and thereby the rotation seal member 12 is pressed tightly to drive shaft 10.

Then, the driving pins 10a and 10c are inserted and fixed in radial holes or recessed portions 10d and 10e of drive shaft 10, respectively. Thereafter, driving gears 15a and 18a are mounted on drive shaft 10 in the state in which the driving pins 10a and 10c are engaged in the recesses 15f and 18f of driving gears 15a and 18a, respectively.

Thereafter, driven gears 15b and 18b are mounted on support shafts 11a and 11b, and engaged with driving gears 15a and 18a, respectively.

Then, side plates 14 and 17 are incorporated into the sub-assembly of intermediate member 7 by inserting drive shaft 10 and support shafts 11a and 11b into side plates 14 and 17 equipped preliminarily with seals S5 and S6 and holding members 16 and 19, respectively. In this case, first side plate can be readily positioned relative to intermediate member 7 by engaging the engaging portions 14h of first side plate 14 with engagement projections 7e of intermediate member 7 so that the assembly step becomes easier. Furthermore, with holding member 16, it is possible to hold the intermediate member 7 and first side plate 14 together temporarily. Holding member 16 can be readily mounted on intermediate member 7 and first side plate 14 by first mounting the holding member 16 on intermediate member 7, and then expanding the holding member 16 onto first side plate 14.

Similarly, second side plate can be readily positioned relative to intermediate member 7 by engaging the engaging portions 17g of second side plate 17 with engagement projections 7e of intermediate member 7 so that the assembly step becomes easier. Furthermore, with holding member 19, it is possible to hold the intermediate member 7 and second side plate 17 together temporarily. Holding member 19 can be readily mounted on intermediate member 7 and second side plate 17 by first mounting the holding member 19 on intermediate member 7, and then expanding the holding member 19 onto second side plate 17.

Then, cover member 6 is incorporated into the subassembly of intermediate member 7 by inserting drive shaft 10 into the through hole 6a of cover member 6, and at the same time fitting the annular projection 6c of cover member 6 into intermediate member 7. Thus, the pump assembly 3 is assembled.

The thus-assembled pump assembly 3 is inserted into pump chamber 4 of housing 2. Then, plug member 5 is screwed into pump chamber 4 and thereby fixed in housing 2. In this case, with the axial force produced by screwing the plug member 5, the intermediate member 7 is pressed against the step portion 4b in pump chamber 4, and thereby positioned stably, so that the positions of parts can be determined accurately in the axial direction or front and rear direction, and the gear pump becomes able to prevent unsteadiness or shakiness due to pressure fluctuations of the operation fluid, as mentioned later. Moreover, with the annular projection 5b, plug member 5 presses seal S1, and thereby improves the sealing between cover member 6 and pump chamber 4 of housing 2.

In this way, parts of the gear pump 1 are sub-assembled preliminarily and inserted, in the form of pump assembly 3, into housing 2. Therefore, the gear pump 1 according to the first embodiment can make simple and easier the assembly process.

The gear pump 1 is operated in the following manner. When drive shaft 10 is driven by the motor in a rotational direction shown by an arrow in FIG. 18, then the driven gear 15b is rotated by driving gear 15a in first pump P1. With this movement, the operating fluid of a lower pressure is sucked, through the through hole 14c of seal block 14e of first side plate 14, from the inlet port, and the operating fluid of a higher pressure is let out into pump chamber P1. The operating fluid of the higher pressure is discharged from the corresponding outlet port.

In second pump P2, the driven gear 18b is rotated by drive shaft 10, through the driving gear 18a, as in first pump P1. With this movement, the operating fluid of a lower pressure is sucked through the through hole 17c of seal block 17e of second side plate 17, and the operating fluid of a higher pressure is let out into second pump chamber P2. This operating fluid of the higher pressure is discharged from the corresponding outlet port.

Thus, the first and second pumps 8 and 9 can perform inlet operations of sucking the operating fluid and outlet operations of discharging the operation fluid under pressure in two separate hydraulic systems. Gear pump 1 in the illustrated example of the first embodiment can function as a tandem external gear pump.

In general, the first and second pumps 8 and 9 are used, respectively, for first and second hydraulic systems such as first and second brake systems of a vehicle. For example, one of the first and second hydraulic systems is for the front left wheel and rear right wheel of the vehicle, and the other system is for the front right wheel and rear left wheel of the vehicle.

The tooth top seal portions 14g and 17g are formed integrally in side plates 14 and 17, respectively. Therefore, this gear pump 1 can reduce the number of constituent parts, and the manufacturing cost, and facilitate the assembly process. The side plates 14 and 17 made of resin is advantageous for reducing the cost of the product produced by cutting while securing the dimensional accuracy with the die forming.

The sealing ability is improved in the following manner. The tops of teeth 15c and 15d of gears 15a and 15b in first pump 8 are arranged to rotate while contacting with the tooth top seal portions 14g of first side plate 14 liquid-tightly. Accordingly, as shown in FIG. 18, there are formed a lower pressure fluid chamber B1 enclosed by the passage portion 14f of through hole 14c communicating with the inlet port, driving gear 15a, driven gear 15b and a part of intermediate member 7, and the pump chamber P1 becomes a higher pressure fluid chamber B2.

Accordingly, seal block 14e is pushed by a pushing force from second fluid chamber B2 toward first fluid chamber B1 (toward the tooth top seal portions 14g) and sideways. Therefore, the engagement portions 14h of seal block 14e push the engagement projections 7e of intermediate member 7 to ensure the close contact between intermediate member 7 and seal block 14e of first side plate 14, and thereby ensures the sealing ability between the higher pressure side and the lower pressure side. Furthermore, with the above-mentioned pushing force, the tooth top seal portions 14g abut properly on the tops of the respective teeth 15c and 15d of gears 15a and 15b, and thereby improve the sealing performance between the higher pressure side and the lower pressure side.

Additionally, the holding member 16 provides a holding force or binding force which acts to force the tooth top seal portions 14g to abut properly against the tops of teeth 15c and 15d of gears 15a and 15b and to improve the sealing. Thus, holding member 16 can improve the sealing between the higher and lower pressure sides and the sealing around the through hole 14c and intermediate member 7.

Second pump 9 is operated in the same manner, and arranged to provide the same effects as first pump 8.

The sides surfaces of the gears are sealed in the following manner. The front and rear side surfaces of each gear 15a or 15b are sealed by the corresponding side seal portion 14d of first side plate 14 and side seal portion 7d of intermediate member 7.

In this case, the axial dimension (or diameter) D4 of driving pin 10a (driving pin 10c) is smaller than or equal to the axial dimension (or thickness) D5 of driving gear 15a (driving gear 18a). Therefore, driving pin 10a (10c) is received within the thickness of driving gear 15a (18a) without projecting from the driving gear on each side, so that the sealing performance is secured on both sides of each of the gears 15 and 18.

The depth H1 of each ring receiving portion 7f is substantially equal to the thickness H2 of first seal ring 13a (second seal ring 13b). Therefore, seal rings 13a and 13b can be held stably, and the sealing performance of driving gear 15a (18a) can be improved.

The diameter of the through hole 14a or 17a of each side plate 14 or 17 is set greater than the diameter of drive shaft 10. The diameter of the through hole 14b or 17b of each side plate 14 or 17 is set greater than the diameter of support shaft 11a or 11b.

Therefore, the drive shaft 10 and support shafts 11a and 11b are inserted loosely with a slight clearance in the respective through holes 14a, 17a, 14b and 17b of side plates 14 and 17. Therefore, even if drive shaft 10 or support shaft 11a or 11b is inclined, the side plates 14 and 17 are not interfered with the inclined shaft and not acted upon by an undesired external force. Therefore, intermediate member 7 and side plates 14 and 17 can maintain the stable abutment and contact therebetween for sealing.

Drive shaft 10 and gears 15 and 18 are positioned relative to one another in the following manner. In the first embodiment, when drive shaft 10 moves axially, the driving pins 10a and 10c moves axially together with drive shaft 10. This axial movement is limited by the seal ring 13a or 13b on the trailing side abutting against the leading side of the driving pin 10a or 10c on the trailing side of this movement.

As shown in FIG. 26A, the distance L2 between the inner sides of driving pins 10a and 10c is set greater than the distance L1 between the outer sides of seal rings 13a and 13b. Therefore, when drive shaft 10 moves to the left as shown by an arrow in FIG. 26B, only the left side surface of first driving pin 10a abuts on the first seal ring 13a on the trailing side which is the right side in the case of the leftward axial movement, and the leftward movement of drive shaft 10 is limited by this abutment between first driving pin 10a and first seal ring 13a.

In the case of rightward movement of drive shaft 10 as shown by an arrow in FIG. 26C, only the right side surface of second driving pin 10c abuts on the second seal ring 13b on the trailing side which is the left side in the case of the rightward axial movement, and the rightward movement of drive shaft 10 is limited by this abutment between second driving pin 10b and second seal ring 13b.

The thicknesses are so determined that, when driving pin 10a (or driving pin 10c) on one side abuts against the first seal ring 13a (or second seal ring 13b), the driving pin 10c (or driving pin 10a) on the opposite is out of contact with the side plate 17 (or side plate 14).

Thus, the gear pump of the first embodiment makes it possible to determine the axial position of drive shaft 10 relative to the first and second gears 15 and 18, to allow axial movement of drive shaft 10 relative to first and second gears within a predetermined range in the thickness of the first and second gears 15 and 18 (15a, 18a), and to limit the axial movement in the first (rearward) direction with the drive projection (10c) on the second (front) side and in the second (forward) direction with the drive projection (10a) on the first (rear) side to prevent extraction in the axial direction.

The drive projections 10a and 10c are arranged to abut against the respective seal rings 13a and 13b only with the inner sides of the drive projections 10a and 10c which confront each other axially across intermediate member 7 so that, at the time of abutment, each drive projection 10a or 10c receives an axial force only in one axial direction. Therefore, it is possible to improve the durability of each drive pin 10a or 10c.

In a comparative example in which the first and second seal rings 13a and 13b and intermediate member 7 are a single integral member, it is necessary to make the intermediate member 7 by using hard metal in order to attain the durability. Therefore, the comparative example increases the manufacturing cost and the weight of the gear pump.

By contrast to the comparative example, the intermediate member 7 according to the first embodiment is a member separate from the seal rings 13a and 13b. Therefore, the intermediate member 7 may be made of a resin or other material which is advantageous in cost reduction and weight reduction. Moreover, as compared to another comparative example in which the first and second seal rings 13a and 13b are provided in the respective side plates 14 and 17 (instead of intermediate member 7), this embodiment makes it possible to determine the axial position of drive shaft 10 relative to each gear 15 or 18 accurately and easily by controlling the dimension of intermediate member 7 only. 73

First seal ring 13a is arranged to close the seal receiving portion 7g. Therefore, first seal ring 13a prevents contact between drive pin 10a and rotation seal member 12, and thereby protect the rotation seal member 12 by preventing abrasion and injury.

This arrangement of first seal ring 13a can improve the sealing separation between pump chambers Pa and P2, and thereby improve the reliability of the gear pump. It is optional to form a similar seal receiving portion 7g at the side of second seal ring 13b and provide a similar rotation seal member 12 in this seal receiving portion 7g in the same manner as in the first pump to achieve the same effect.

It is possible to form a seal receiving portion 7g at the middle of through hole 7a, by a first method of forming the intermediate member 7 of a metallic material by joining two separate parts of the metallic material shaped to form the seal receiving portion between the two separate parts, or by a second method of forming the intermediate member of a resin by using a slide (or slide mold)? inserted in the through hole. However, these methods deteriorates the productivity, and incurs the size increase. Moreover, it is difficult to insert the rotation seal 12 in the seal receiving portion 7g at the middle of intermediate member 7. By contrast, in the first embodiment, the seal receiving portion 7g can be formed from one side of intermediate member 7, so that the gear pump of the first embodiment is advantageous for the productivity and the assembly process As shown in FIG. 16A, the radial length D1 from the center line of drive shaft 10 to the top of drive pin 10a (or 10c) is smaller than the radius D2 of seal ring 13a (or 13b). Therefore, by decreasing the projecting length of drive pin 10a (10c), it is possible to decrease the size or radius of driving gear 15a (18a) and hence to decrease the size of the gear pump 1.

Figure 27:
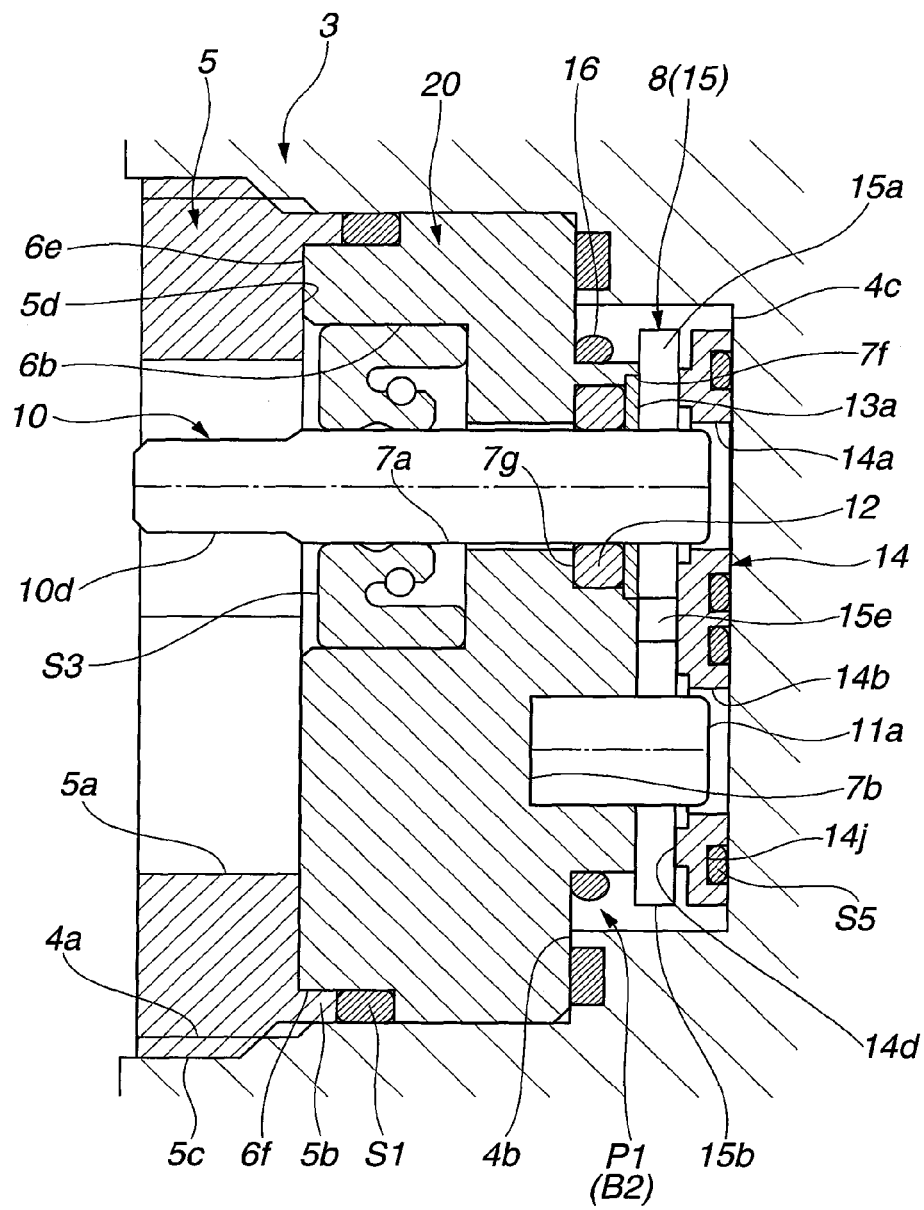
FIG. 27 is a sectional view showing a gear pump according to a second embodiment.

FIG. 27 shows, in section, a gear pump 1 according to a second embodiment of the present invention. The following explanation is directed only to points different from the first embodiment, and repetitive explanation is omitted as to similar component parts to which the same reference numerals are given.

The gear pump 1 of FIG. 27 employs a single type external gear pump unlike the tandem external gear pump of the first embodiment. Thus, the parts of the second pump 9 are omitted from the gear pump of the first embodiment, and the gear pump of the second embodiment includes only the first pump 8. Instead of the cover member 6 and seal member 7 employed in the gear pump of the first embodiment, the gear pump of FIG. 27 employs a seal member 20. Seal member 20 includes a first side portion substantially identical to the first (right) side portion of the intermediate member 7 shown in FIG. 7 for forming the first pump, and a second side portion which is substantially identical to the second (left) side portion of the cover member 6 shown in FIG. 7 and which is integral with the first side portion of seal member 20. Therefore, the gear pump of FIG. 27 can provides the same advantageous effects and operations as in the first embodiment.

Figure 28:
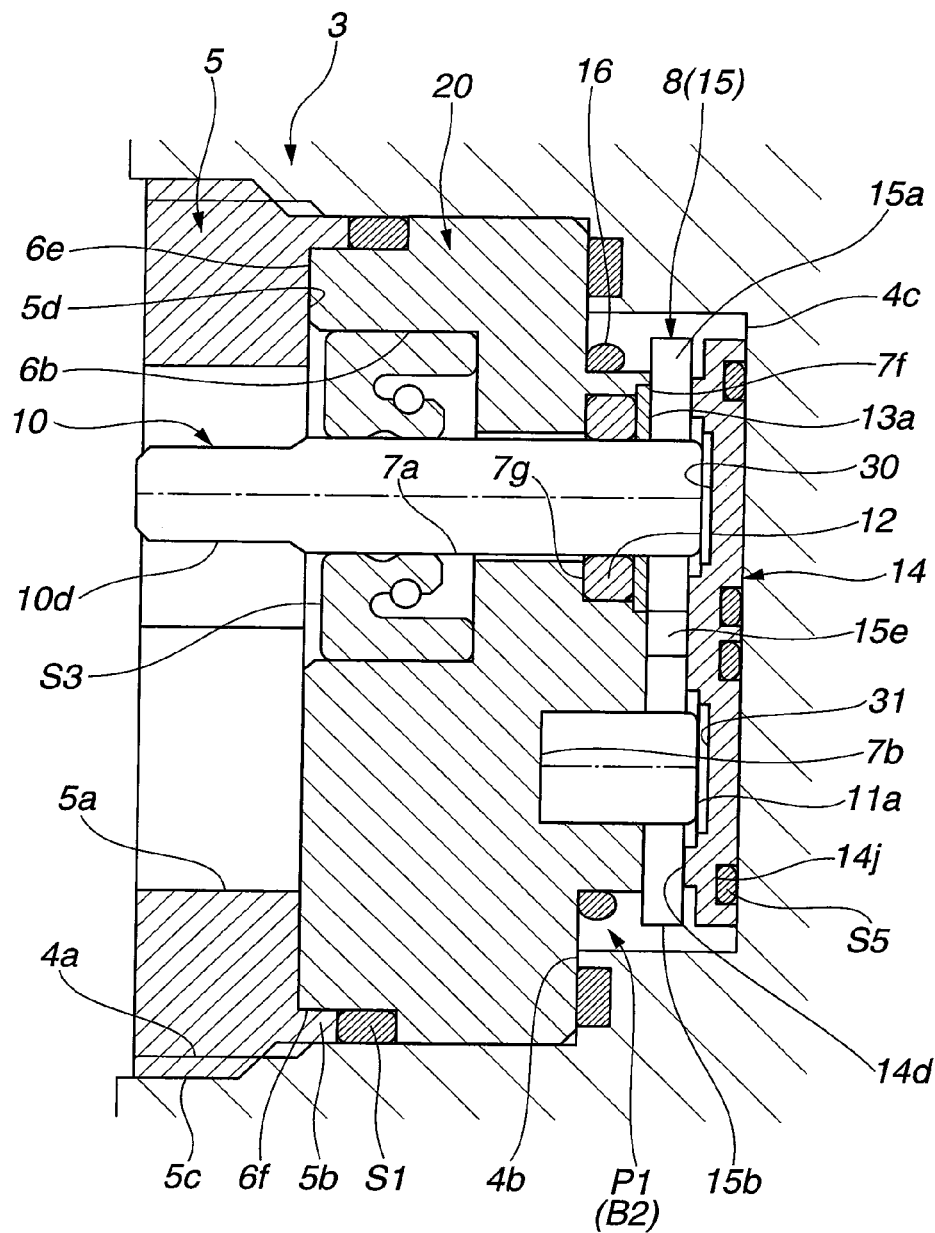
FIG. 28 is a sectional view showing a gear pump according to a third embodiment.

FIG. 28 shows, in section, a gear pump according to a third embodiment of the present invention. The following explanation is directed only to points different from the second embodiment, and repetitive explanation is omitted as to similar component parts to which the same reference numerals are given.

As shown in FIG. 28, the side plate 14 includes recessed portions (or non-through holes) 30 and 31, instead of the through holes 14a and 14b shown in FIG. 27. Therefore, the gear pump of FIG. 28 can provides the same advantageous effects and operations as in the first or second embodiment.

Figure 29:
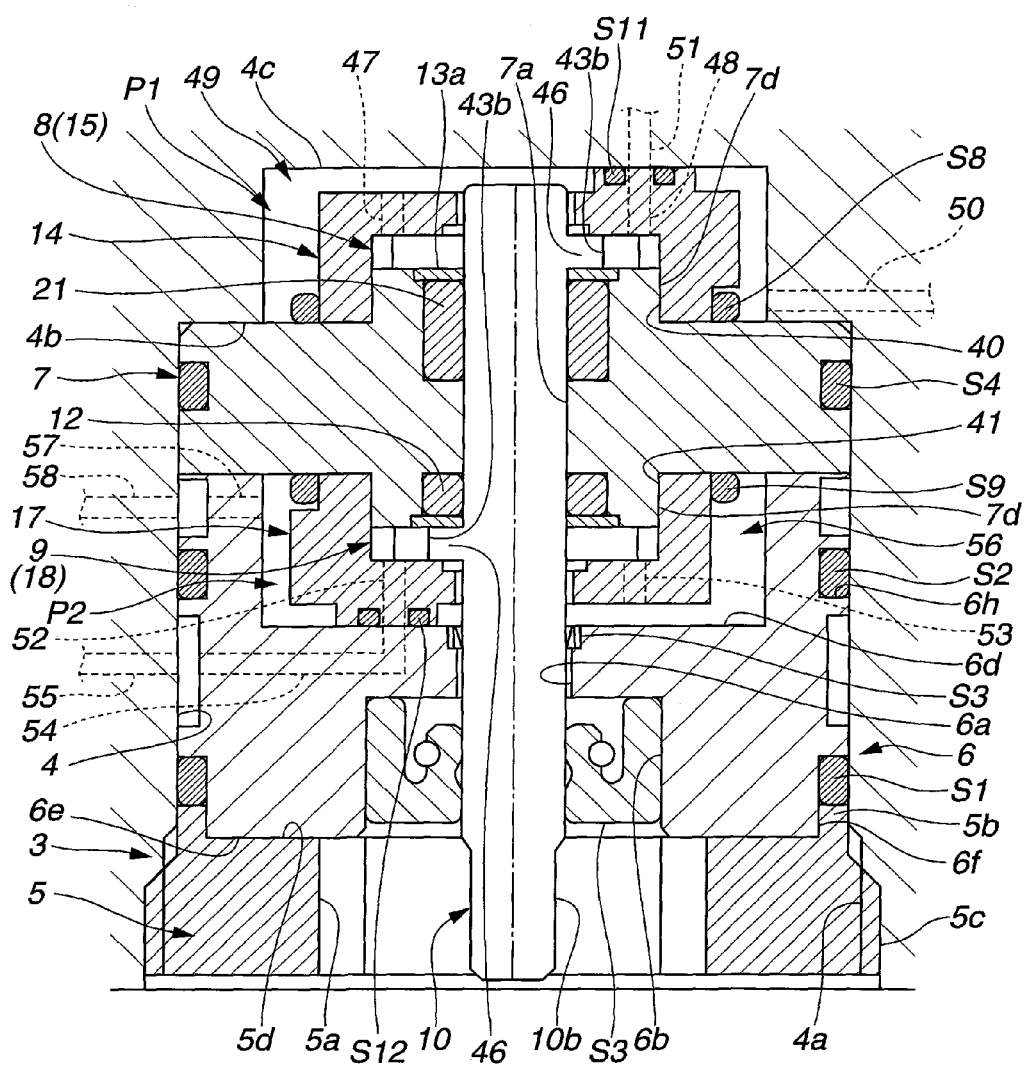
FIG. 29 is a sectional view showing a gear pump according to a fourth embodiment.

FIG. 29 shows a gear pump 1 according to a fourth embodiment of the present invention. The gear pump 1 shown In FIG. 29 includes many component parts having substantially identical counterparts in the gear pump of the first embodiment. Therefore, the same reference numerals are given to components parts similar to the corresponding component parts of gear pump 1 of the first embodiment, repetitive explanation is omitted, and the following explanation is directed only to points different from the first embodiment.

The gear pump 1 of the fourth embodiment is an internal gear pump unlike the first embodiment in which the external gear pump is employed. In the example of FIG. 29, the gear pump 1 is a tandem internal gear pump.

In the example shown in FIG. 29, the first and second side plates 14 and 17 are cup-shaped members which are identical in the shape. Instead of the seal blocks 14e and 17e, each side plate 14 or 17 includes an outer annular seal portion or wall 40 or 41 projecting from a bottom wall or end wall, axially toward intermediate member 7 and fitting over one of side seal portions 7d of the intermediate member 7.

In the space surrounded by the outer annular seal portion 40 of first side plate 14 and located axially between the first side seal portion 7d of intermediate member 7 and the end wall of first side plate 14, there is provided the first gear 15 forming the first pump P1. In the space surrounded by the outer annular seal portion 41 of second side plate 17 and located axially between the second side seal portion 7d of intermediate member 7 and the end wall of second side plate 17, there is provided the second gear 18 forming the second pump P2. An annular seal S8 encloses the outer annual seal portion 40 and thereby seals the first pump P1, and an annular seal S9 encloses the outer annual seal portion 41 and thereby seals the second pump P2.

These annular seals S8 and S9 are stretched partially around the side plates 14 and 17, respectively, (though not shown), like the holding members 16 and 19, and thereby arranged to hold or bind the intermediate member 7 and first and second side plates 14 and 17.

Figure 30:
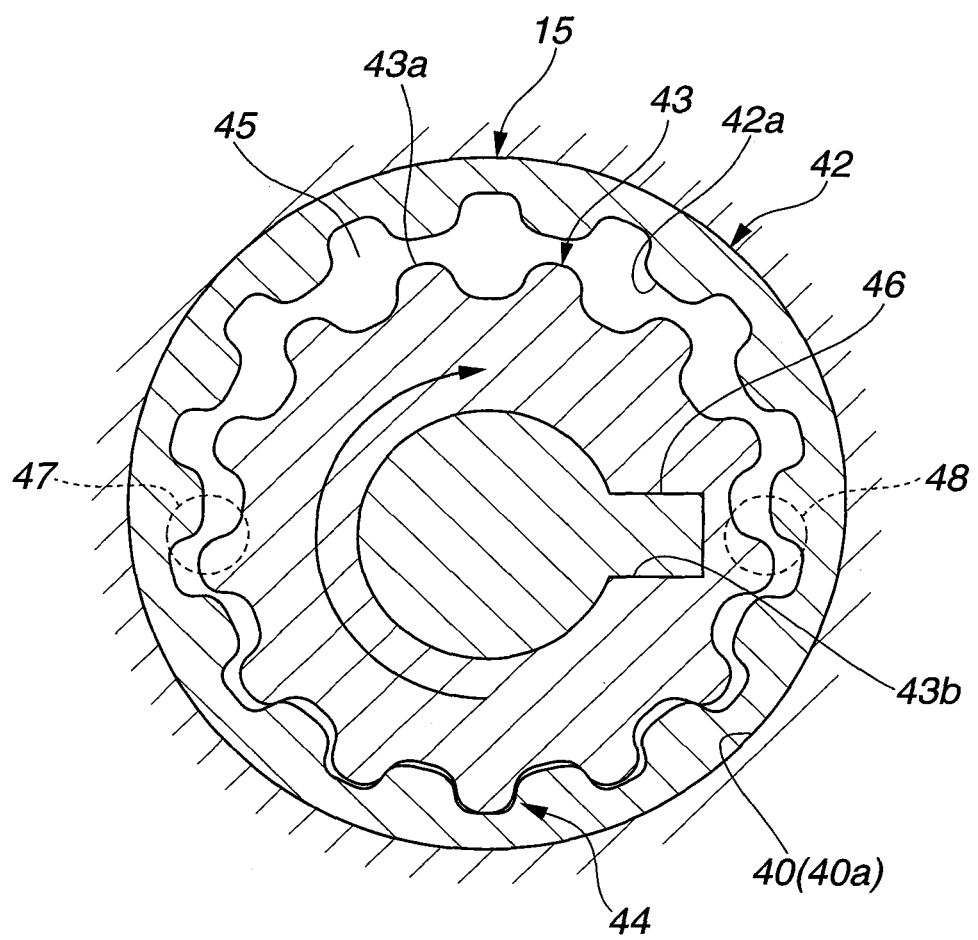
FIG. 30 is a view for illustrating operations of the gear pump of FIG. 29.

As shown in FIG. 30, the first gear 15 of first pump 8 includes an outer rotor 42 (serving as a pump element) including an internally toothed portion 42a formed in the inside circumference, and an inner rotor 43 (serving as a pump element) including an externally toothed portion 43a form in the outside circumference. Inner rotor 43 is disposed eccentrically in outer rotor 42, and the externally toothed portion 43a is engaged with the internally toothed portion 42a in an engagement region 44, so that a pump chamber 45 is formed between outer and inner rotors 42 and 43.

Drive projection 46 is formed integrally in drive shaft 10 at each of positions confronting the inner rotors 43 of first and second pumps 8 and 9. Each drive projection 46 projects radially outwards. In this example, each drive projection 46 is in the form of a rectangular column. Drive projections 46 are fit, respectively, in drive recesses 43b formed in inner rotors 43. Each drive recess 43b is in the form of a cutout formed in the inner rotor 43. The axial dimension of each drive projection 46 is smaller than the thickness of inner rotor 43.

Thus, in each pump 8 or 9, the inner rotor 43 is mounted on drive shaft 10 and connected with drive shaft 10 so as to prevent relative rotation. Therefore, inner rotor 43 is driven by drive shaft 10, and outer rotor 42 is rotated by inner rotor 43 in the same rotational direction. Outer rotor 42 is fit rotatably in the outer seal portion 40 of the side plate 14 or 17 so that the outside circumference of outer rotor 42 is in sliding contact with the inside circumference of the outer seal portion 40 during the rotation of outer rotor 42 in outer seal portion 40.

First side plate 14 is formed with through holes 47 and 48 at positions confronting the pump chamber 45 as shown in FIGS. 29 and 30. Each through hole 47 or 48 may be in the form of a groove shaped like a crescent. Through hole 47 is connected with an inlet port 50 of pump chamber 4, through a hollow portion 49 formed between first side plate 14 and the wall of pump chamber 4. Through hole 48 is connected with an outlet port 51 of pump chamber 4.

Second side plate 17 and second gear 18 of second pump 9 are constructed in the same manner as first side plate 14 and first gear 15 in first pump 8. Second side plate 17 is formed with through holes 52 and 53.

Through hole 52 is connected with an inlet port 55 of pump chamber 4, through a fluid passage 54 formed in cover member 6. Through hole 53 is connected with an outlet port 58 of pump chamber 4 through an interspace 56 formed between the cover member 6 and second side plate 17 and a fluid passage 57 formed in cover member 6.

On the first (rear) side of intermediate member 7 toward first gear 15, there is provided a bearing member 21 (59) forcibly fitting over drive shaft 10. On the second (front) side of intermediate member 7 toward second gear 18, there is provided a rotation seal member 12 like the gear pump of the first embodiment. A seal S11 is provided around through hole 48 of first side plate 14 and arranged to provide a sealing between the space 49 and the through hole 48. A seal S12 is provided around through hole 52 of second side plate 17 and arranged to provide a sealing between the space 56 and the through hole 52.

Gear pump 1 according to the fourth embodiment is operated in the following manner. When drive shaft 10 is driven in the rotational direction shown by an arrow in FIG. 30, by a motor, the outer rotor 42 is driven through inner rotor 43 in each pump 8 or 9. In this case, each pump produces a pumping action with the volume change of pump chamber 45 in each of gears 15 and 18. Therefore, in first pump 8, the fluid of a lower pressure is introduced from inlet port 50 through the through hole 47 of first side plate 14. The introduced fluid is pressurized, and outputted to outlet port 51 through the through hole 48 of first side plate 14.

In second pump 9, the fluid of a lower pressure is introduced from inlet port 55 through the through hole 52 of second side plate 17. The introduced fluid is pressurized, and outputted to outlet port 58 through the through hole 53 of second side plate 17.

Thus, the first and second pumps 8 and 9 can perform inlet operations of sucking the operating fluid and outlet operations of discharging the operation fluid under pressure in two separate hydraulic systems. Gear pump 1 in the illustrated example of the fourth embodiment can function as a tandem internal gear pump.

The outer seal portion 40 or 41 is formed integrally in each of first and second side plates 14 and 17. The tooth top seal portion 14g or 17g is formed integrally in each of first and second side plates 14 and 17. Therefore, it is possible to reduce the number of required component parts, and the manufacturing cost, and to facilitate the assembly process. The use of side plates 14 and 17 made of resin is advantageous in improving the manufacturing accuracy and the sealing performance. Moreover, the sealing performance with intermediate member 7 can be secured with holding members 16 and 19.

In the fourth embodiment, for either or both of the first and second gears 15 and 18 (42, 43), it is possible to employ the drive pin (10a, 10c) which is inserted in the radial hole (10d, 10e) formed in the drive shaft 10 and which is engaged in the drive recess (43b), instead of the integrally formed drive projection 46.

The present invention is not limited to the illustrated examples. Various variations and modifications are possible within the purview of the present invention. For example, it is possible to change the materials and configurations of some constituent parts. When the drive shaft explained in the first embodiment is arranged to rotate in the opposite rotational direction, then operating fluid flows from the outlet port to the inlet port.

It is possible to employ various combinations of various shapes of the drive shaft 10 and support shafts 11a and 11b, and the through holes 14a and 14b of sealing member 14. As the cross sectional shapes of these parts, besides the circular shape, it is possible to employ a noncircular shape such as elongated, elliptical, hexagonal, rectangular or square shape. In the illustrated embodiments, these drive shaft 10 and support shafts 11a and 11b are inserted loosely with a slight clearance in the respective holes 14a, 17a, 14b and 17b of side plates 14 and 17, so that, even if drive shaft 10 or support shaft 11a or 11b is inclined, the side plates 14 and 17 are not interfered with the inclined shaft and not acted upon by an undesired external force.

According to the illustrated embodiments of the present invention, a gear pump can have the following constructions. In the following, reference numerals in parentheses are merely illustrative examples for facilitating understanding.

(C1) A gear pump (1) comprises: a gear or gearing (15, 18, 42, 43) disposed in a pump chamber (4) formed in a housing (2) and adapted to be driven by a drive shaft (10); a pair of side plate members (14, 17; 7, 20) adjoining the (opposite) side surfaces of the gear, respectively, to restrain leakage of an operating fluid; a tip (or circumference) seal member (14e, 17e, 40, 41) to seal a gear tip or circumference (15c, 15d, 18c, 18d) of the gear; and a sealing member (14, 17) formed integrally with a first one (14, 17) of the side plate members and the tip seal member.

The thus-constructed gear pump can simplify the constituent parts, improve the ease of the assembly, reduce the manufacturing cost, and improve the sealing performance. The gear pump may further comprise any one or more of the following features.

(C2) The gear pump comprises, as the gear, first and second gears (15, 18, 42, 43) adapted to be driven by the drive shaft (10); a second one (7) of the side plate members is a partition member (7) disposed (axially) between the first and second gears and arranged to divide the pump chamber into a first chamber (P1) in which the first gear is disposed and a second chamber (P2) in which the second gear is disposed; and the gear pump further comprises, as the sealing member, a first sealing member (14, 17) defining the first chamber between the partition member and the first sealing member, and a second sealing member (17, 14) defining the second chamber between the partition member and the second sealing member. Accordingly, the partition member (7) can be used in common for the first and second gears, and the construction of the tandem gear pump is simplified.

(C3) The partition member (7) includes a first side engagement projection (7e) formed on a first chamber's side and a second side engagement projection (7e) formed on a second chamber's side, the tip seal member of the sealing member (14, 17) adjacent to the first gear (15, 18, 42, 43) is engaged with the first side engagement projection (7*e*) of the partition member (7), and the tip seal member of the sealing member adjacent to the second gear (18, 15) is engaged with the second side engagement projection (7*e*) of the partition member (7). Therefore, it is possible to hold the state in which the partition member (7) and the sealing members (14, 17) are correctly positioned, even during a process of assembling and fixing.

(C4) The or each sealing member is arranged to be movable toward a center of rotation of the gear. Therefore, the sealing member can maintain the sealing performance even if the drive shaft and/or support shafts 11*a* and 11*b* are moved relatively or inclined. In the illustrated embodiments, each or the shaft is loosely received in a hole formed in the sealing member.

(C5) The (or each) gear or gearing (15, 18) includes a driving gear (15*a*, 18*a*) and a driven gear (15*b*, 18*b*) engaged with the driving gear and arranged to be driven by the driving gear, and the driving and driven gears are disposed (axially) between the side members (14, 17, 7, 20). The gear pump is of an external type, and capable of providing the same advantageous effects and operations as in (C1).

(C6) The gear (15, 18) includes, as the driving gear, a first driving gear (15*a*, 18*a*) and a second driving gear (18*a*, 15*a*), and, as the driven gear, a first driven gear (15*b*, 18*b*) driven by the first driving gear and a second driven gear (18*b*, 15*b*) driven by the second driving gear, a second one (7) of the side plate members (14 or 17, 7) is a partition member disposed (axially) between a first gear set (15, 18) of the first driving and driven gears and a second gear set (18, 15) of the second driving and driven gears, and arranged to divide the pump chamber (4) into a first chamber (P1) in which the first driving and driven gears are disposed and a second chamber (P2) in which the second driving and driven gears are disposed, and each of the first and second chambers is defined by the partition member (7) and the sealing member (14, 17) provided at the side of each of the first and second gear sets. The thus-constructed tandem type gear pump can provide the same advantageous effects and operations as in (C1).

(C7) The partition member (7) is positioned axially by the housing (2). This arrangement enables accurate positions of the partition member (7) and other peripheral members, and prevents rattling and unfirmness due to pressure fluctuation in the pump chamber 4.

(C8) The partition member (7) includes a first side engagement projection (7*e*) formed on a first chamber's side and a second side engagement projection (7*e*) formed on a second chamber's side, the tip seal member (14*e*, 14*g*, 17*e*, 17*g*) of the sealing member (14, 17) adjacent to the first gear set (15, 18) includes an engagement portion (14*h*) engaged with the first side engagement projection (7*e*) of the partition member, and the tip seal member (17*e*, 17*g*, 14*e*, 14*g*) of the sealing member (17, 14) adjacent to the second gear set (18, 15) includes an engagement portion (17*h*) engaged with the second side engagement projection (7*e*) of the partition member. Therefore, the gear pump can provides the same effects and operations.

(C9) The gear pump further comprises at least one holding member (16, 19) arranged to extend around the tip seal member or portion (14*g*, 17*g*) of the sealing member (or one of the sealing members) and the engagement projection (7*e*) of the partition member and thereby to hold the engagement projection of the partition member and the sealing member (14, 17) together non-permanently or temporarily. The holding member can hold the partition member (7) and the sealing member (14, 17) provisionally and thereby facilitate the assembly operations.

(C10) The engagement portion (14*h*, 17*h*) of the sealing member (14, 17) is engaged liquid-tightly with the engagement projection by a holding force of the holding member (16, 19). Therefore, the gear pump can improve the sealing effectiveness between the tip seal portion (14*g*, 17*g*) and the engagement projection (7*e*).

The holding member (16, 19) may be arranged to seal an interface between the outer circumference of the tip seal member or portion (14*e*, 14*g*, 17*e*, 17*g*) and the partition member (7) so that the sealing effectiveness therebetween is improved.

(C11) The sealing member (14, 17) is made of a resin. This material can improve the formability of the sealing member, the production accuracy and hence the sealing performance.

(C12) At least the engagement projection (7*e*) of the partition member (7) is made of a resin. This material can improve the formability of the engagement projection (7*e*), the production accuracy and hence the sealing performance.

(C13) According to the illustrated embodiments, a gear pump (1) comprises: a gear (15, 18, 42, 43) adapted to be driven by a drive shaft (10); and a sealing member (14, 17) covering a side surface and a gear tip of the gear adjacently, to restrain leakage of an operating fluid. The sealing member includes a side seal portion (14*d*, 17*d*) covering the side surface of the gear adjacently and a tip (or circumference) seal portion (14*g*, 17*g*, 40, 41) covering the gear tip or circumference of the gear adjacently. The sealing member is arranged to be urged toward the side surface of the gear and toward the gear tip of the gear. The gear pump may further comprise an urging means for urging the sealing member (14, 17) toward the side surface of the gear and the gear tip of the gear. This construction can improve the sealing effectiveness of the gear (15, 18). The gear pump recited in (C13) may further comprise any one or more of the following features.

(C14) The gear pump may comprise the urging means for urging the sealing member (14, 17) by using a pressure of the operating fluid. The urging means may include a means for defining a lower pressure chamber (B1) separated from a higher pressure chamber (B2). Therefore, the gear pump can improve the sealing effectiveness of the gear (15, 18, 42, 43) without increasing the number of required component parts.

(C15) The sealing member (14, 17) is arranged to separate a first (lower) pressure chamber (B1) and a second (higher) pressure chamber (B2) from each other, and the urging means includes means for urging the sealing member toward the first pressure chamber (B1) by using a pressure difference between a higher pressure in the second pressure chamber (B2) and a lower pressure in the first pressure chamber (B1). Therefore, the gear pump can improve the sealing effectiveness with a simple construction.

(C16) The gear pump (1) comprises first and second driving gears (15*a*, 18*a*) as the driving gear and first and second driven gears (15*b*, 18*b*) as the driven gear; and a partition member (7) disposed between a first gear set (15, 18) of the first driving gear and the first driven gear and a second gear set (18, 15) of the second driving gear and the second driven gear, and arranged to divide a pump chamber into a first gear chamber (P1, P2) in which the first gear set is disposed and a second gear chamber in which the second gear set is disposed, and the gear chambers (P1, P2) are defined by the partition member (7) and the sealing members (14, 17) provided for the first and second gear sets. Therefore, the gear pump of the tandem type can provide the same advantageous effects and operations as in (C16).

(C17) The partition member (7) includes a first side engagement projection (7e) formed on a first chamber's side and a second side engagement projection (7e) formed on a second chamber's side, the tip seal member (14e, 14g, 17e, 17g) of the sealing member (14, 17) adjacent to the first gear (15, 18, 42, 43) includes an engagement portion (14h, 17h) engaged with the first side engagement projection (7e) of the partition member (7), and the tip seal member (17e, 17g, 14e, 14h) of the sealing member (17, 14) adjacent to the second gear (18, 15, 42, 43) includes an engagement portion (17h, 14h) engaged with the second side engagement projection (7e) of the partition member (7). Therefore, the gear pump provides the same advantageous effects and operations as in (C3) or (C8).

(C18) The gear pump further comprises a holding member (16, 19) arranged to extend around the tip seal portion (14g, 17g) of one of the sealing members (14, 17) and one of the engagement projections (7e) and thereby to hold the engagement projection (7e) and the sealing member (14, 17) non-permanently or temporarily. Therefore, the gear pump can provides the same advantageous effects and operations as in (C9).

(C19) The engagement portion (14h, 17h) is engaged liquid-tightly with the engagement projection by a holding force of the holding member (16, 19). Therefore, the gear pump can provide the same advantageous effects and operations as in (C10).

(C20) A gear pump (1) comprises: a driving gear (15a, 18a) adapted to be driven by a drive shaft (10); a driven gear (15b, 18b) adapted to be driven by the driving gear; and a sealing member (14, 17) including a side seal portion (14d, 17d) covering side surfaces of the driving and driven gears, a tip (or circumference) seal portion (14e, 17e, 14g, 17g) covering gear tips or circumferences of the driving and driven gears. The sealing member (14, 17) is arranged to separate a first pressure chamber (B1) and a second pressure chamber (B2) from each other, and the sealing member is arranged to be urged toward the first pressure chamber by a pressure difference, produced by operation of the gear pump, between a higher pressure in the second pressure chamber (B2) and a lower pressure in the first pressure chamber (B1). The thus-constructed gear pump can provide the same advantageous effects and operations as in (C1) and (C13).

(C21) The gear pump (1) comprises: first and second driving gears (15a, 18a) as the driving gear and first and second driven gears (15b, 18b) as the driven gear; and a partition member (7) disposed between a first gear set (15, 18) of the first driving gear and the first driven gear and a second gear set (18, 15) of the second driving gear and the second driven gear, and arranged to divide a pump chamber (4) into a first gear chamber (P1) in which the first gear set is disposed and a second gear chamber (P2) in which the second gear set is disposed, and each of the gear chambers (P1, P2) is defined by the partition member (7) and one of the sealing members (14, 17) between which the first and second gear sets are disposed. Therefore, the gear pump of the tandem type can provide the same advantageous effects and operations as in (C20).

(C22) According to the illustrated embodiments, a gear pump (1) comprises: a gear or gearing (42, 43, 15(15a, 15b), 18(18a, 18b)) disposed in a pump chamber (4) formed in a housing (2) and adapted to be driven by a drive shaft (10); and first and second side plate members (14, 17; 7, 20) adjoining the (opposite) side surfaces of the gear, respectively, to restrain leakage of an operating fluid. The first side plate member (14, 17) includes a circumference (or tip) seal portion (40, 41, 14e, 17e) to seal an outer circumference (gear tip)(15c, 15d, 18c, 18d) of the gear. Therefore, the gear pump can provide the same advantageous effects and operation as in (C1) even in the case of an internal gear pump.

(X1) According to one of possible interpretations of the illustrated embodiments according to the present invention, a gear pump has a basic construction which comprises: a gear or gearing (15, 18) adapted to be driven by a drive shaft (10); a side (plate) member (14, 17) including a side seal portion (14d, 17d) adjoining or covering a side surface (first side surface) of the gear, and a tip or circumference seal portion (14e, 17e, 40, 41) adjoining or covering a gear tip or an outer circumference of the gear.

In addition to the basic construction, the gear pump may further comprise any one or more of the following features (X2)~(X9).

(X2) The side member (14, 17) includes a side plate portion extending (radially with respect to the rotation axis of the gear or the drive shaft) on a first side of the gear, and the side seal portion (14d, 17d) projects from the side plate portion toward the gear (15, 18) axially (along the rotation axis of the gear). The tip seal portion (14e, 17e, 40, 41) projects from the side plate portion toward the gear, axially beyond the side seal portion and extends circumferentially around the gear so as to cover at least part of the circumference of the gear.

(X3) The side plate portion of the side member (14, 17) is formed with a (through or non-through) hole (14a, 17a) for receiving the drive shaft (or holes (14a, 14b, 17a, 17b) for receiving the drive shaft and a support shaft (11a, 11b) supporting a driven gear). The side seal portion (14d, 17d) extends around the hole (14a, 17a) (or around the holes (14a, 14b, 17a, 17b)).

(X4) In addition to the side (plate) member (14, 17) which is hereinafter referred to as a first side member, the gear pump further comprises a second side member (7, 20) including a gear seal portion (7d, 7e) which includes a side seal portion (7d) adjoining or covering the other side surface (second side surface) of the gear (15, 18), and an engaging portion (7e) abutting on the tip seal portion (14e, 14g, 14h, 17e, 17g, 17h) of the first side member (14, 17).

(X5) The tip or circumference seal portion (14e, 17e) of the first side member (14, 17) has a concave abutting surface (14g, 14h; 17g, 17h) facing radially inwards (toward the rotation axis of the gear) and extending axially from the side plate portion of the first side member located on a first side of the gear to a second side of the gear over the gear, and the engagement portion (7e) of the second side member (7, 20) has a convex abutting surface facing radially outwards and abutting on the concave abutting surface of the tip seal portion of the first side member on the second side of the gear.

(X6) The gear pump further comprises a housing member (2, 6) defining a higher pressure chamber (B2, P1) communicating with an outlet port of the gear pump, and the (first) side member (14, 17) includes a hollow portion (14c, 14f, 17c, 17f) defining a lower pressure chamber (B1) communicating with an inlet port of the gear pump. The (first) side member (14, 17) is arranged to receive a lower pressure in the lower pressure chamber and a higher pressure in the higher pressure chamber so that the side seal portion is urged toward the side surface of the gear, and the tip seal portion is urged toward the gear tip of the gear (and toward the engaging portion (7e) of the second side member (7)).

(X7) The gear pump further comprises a holding member (16, 19) binding the tip seal portion (14e, 17e) of the first side member (14, 17) and the gear seal portion (7d, 7e) of the second side member (7, 20) so as to urge the tip seal portion (14e, 17e) toward the engaging portion (7e) of the second side member (7).

(X8) The gear or gearing (15, 18) includes a driving gear (15a, 18a) mounted on the drive shaft (10), and a driven gear (15b, 18b) engaged with the driving gear. The tip seal portion (14e, 17e) of the first side member (14, 17) includes two of the concave abutting surfaces (14g, 14h; 17g, 17h) facing radially inwards toward the rotation axes of the driving gear and driven gear, respectively and extending axially from the side plate portion of the first side member located on the first side of the gear to the opposite second side of the gear over the respective gears, and the gear seal portion (7d, 7e) of the second side member (7, 20) includes two of the engagement portions (7e) having the convex abutting surfaces facing radially outwards and, respectively, abutting on the concave abutting surfaces of the tip seal portion of the first side member on the second side of the gear.

(X9) The hollow portion of the (first) side member (14, 17) includes a through hole (14c, 17c) extending axially at such a position that the concave abutting surface (14g, 14h, 17g, 17h) is located between the rotation axis of the gear (or the drive shaft) and the through hole (14c, 17c).

This application is based on a prior Japanese Patent Application No. 2008-292906 filed on Nov. 17, 2008. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A gear pump comprising:
a gear disposed in a pump chamber formed in a housing and adapted to be driven by a drive shaft;
a pair of side plate members adjoining side surfaces of the gear, respectively, to restrain leakage of an operating fluid;
a tip seal member to seal a gear tip of the gear; and
a sealing member formed integrally with a first one of the side plate members and the tip seal member;
wherein the sealing member is made of resin; and
wherein the sealing member of the resin is an integral member including, as integral parts of the sealing member, the first one of the side plate members and the tip seal member.

2. A gear pump comprising:
a gear disposed in a pump chamber formed in a housing and adapted to be driven by a drive shaft;
a pair of side plate members adjoining side surfaces of the gear, respectively, to restrain leakage of an operating fluid;
a tip seal member to seal a gear tip of the gear; and
a sealing member formed integrally with a first one of the side plate members and the tip seal member;
wherein the gear pump comprises, as the gear, first and second gears adapted to be driven by the drive shaft; a second one of the side plate members is a partition member disposed between the first and second gears and arranged to divide the pump chamber into a first chamber in which the first gear is disposed and a second chamber in which the second gear is disposed; and the gear pump further comprises, as the sealing member, a first sealing member defining the first chamber formed between the partition member and the first sealing member, and a second sealing member defining the second chamber formed between the partition member and the second sealing member.

3. The gear pump as claimed in claim 2, wherein the partition member includes a first side engagement projection formed on a first chamber's side and a second side engagement projection formed on a second chamber's side, the tip seal member of the sealing member adjacent to the first gear is engaged with the first side engagement projection of the partition member, and the tip seal member of the sealing member adjacent to the second gear is engaged with the second side engagement projection of the partition member.

4. The gear pump as claimed in claim 1, wherein the sealing member is arranged to be movable toward a center of rotation of the gear.

5. The gear pump as claimed in claim 4, wherein the gear includes a driving gear and a driven gear engaged with the driving gear, and the driving and driven gears are disposed between the side members.

6. The gear pump as claimed in claim 5, wherein the gear includes, as the driving gear, a first driving gear and a second driving gear, and, as the driven gear, a first driven gear driven by the first driving gear and a second driven gear driven by the second driving gear, a second one of the side plate members is a partition member disposed between a first gear set of the first driving and driven gears and a second gear set of the second driving and driven gears, and arranged to divide the pump chamber into a first chamber in which the first driving and driven gears are disposed and a second chamber in which the second driving and driven gears are disposed, and each of the first and second chambers is defined by the partition member and the sealing member provided at the side of each of the first and second gear sets.

7. The gear pump as claimed in claim 6, wherein the gear pump comprises the housing which is arranged to position the partition member axially.

8. The gear pump as claimed in claim 6, wherein the partition member includes a first side engagement projection formed on a first chamber's side and a second side engagement projection formed on a second chamber's side, the tip seal member of the sealing member adjacent to the first gear set includes an engagement portion engaged with the first side engagement projection of the partition member, and the tip seal member of the sealing member adjacent to the second gear set includes an engagement portion engaged with the second side engagement projection of the partition member.

9. The gear pump as claimed in claim 8, wherein the gear pump further comprises a holding member arranged to extend around the tip seal member of one of the sealing members and one of the engagement projections of the partition member and thereby to hold the engagement projection of the partition member and the sealing member together non-permanently.

10. The gear pump as claimed in claim 9, wherein the engagement portion is engaged liquid-tightly with the engagement projection by a holding force of the holding member.

11. The gear pump as claimed in claim 8, wherein at least the engagement projection of the partition member is made of a resin.

12. A gear pump comprising:
a gear adapted to be driven by a drive shaft; and
a sealing member covering a side surface and a gear tip of the gear adjacently, to restrain leakage of an operating fluid, the sealing member including a side plate portion extending along the side surface of the gear, a side seal portion covering the side surface of the gear adjacently and a tip seal portion projecting from the side plate portion toward the gear and covering the gear tip of the gear adjacently, the sealing member being urged toward the side surface of the gear and to the gear tip of the gear by an urging means;

wherein the sealing member is made of resin.

13. The gear pump as claimed in claim 12, wherein the gear pump comprises the urging means for urging the sealing member by using a pressure of the operating fluid.

14. The gear pump as claimed in claim 13, wherein the gear includes a driving gear and a driven gear, the sealing member is arranged to separate a first pressure chamber and a second pressure chamber from each other, and the urging means includes means for urging the sealing member toward the first pressure chamber by using a pressure difference between a higher pressure in the second pressure chamber and a lower pressure in the first pressure chamber.

15. The gear pump as claimed in claim 14, wherein the gear pump comprises first and second driving gears as the driving gear and first and second driven gears as the driven gear; and a partition member disposed between a first gear set of the first driving gear and the first driven gear and a second gear set of the second driving gear and the second driven gear, and arranged to divide a pump chamber into a first gear chamber in which the first gear set is disposed and a second gear chamber in which the second gear set is disposed, and the gear chambers are defined by the partition member and the sealing members provided for the first and second gear sets.

16. The gear pump as claimed in claim 15, wherein the partition member includes a first side engagement projection formed on a first chamber's side and a second side engagement projection formed on a second chamber's side, the tip seal member of the sealing member adjacent to the first gear includes an engagement portion engaged with the first side engagement projection of the partition member, and the tip seal member of the sealing member adjacent to the second gear includes an engagement portion engaged with the second side engagement projection of the partition member.

17. The gear pump as claimed in claim 16, wherein the gear pump further comprises a holding member arranged to extend around the gear tip seal portion of one of the sealing members and one of the engagement projection and thereby to hold the engagement projection and the sealing member non-permanently.

18. The gear pump as claimed in claim 17, wherein the engagement portion is engaged liquid-tightly with the engagement projection by a holding force of the holding member.

19. A gear pump comprising:
a driving gear adapted to be driven by a drive shaft;
a driven gear adapted to be driven by the driving gear; and
a sealing member including a side plate portion extending on one side of the driving and driven gears, a side seal portion covering side surfaces of the driving and driven gears, and a tip seal portion projecting from the side plate portion toward the driving and driven gears, and covering gear tips of the driving and driven gears, the sealing member being arranged to separate a first pressure chamber and a second pressure chamber from each other, and the sealing member being arranged to be urged toward the first pressure chamber by a pressure difference, produced by operation of the gear pump, between a higher pressure in the second pressure chamber and a lower pressure in the first pressure chamber;
wherein the sealing member is made of resin.

20. The gear pump as claimed in claim 19, wherein the gear pump comprises:
first and second driving gears as the driving gear and first and second driven gears as the driven gear; and
a partition member disposed between a first gear set of the first driving gear and the first driven gear and a second gear set of the second driving gear and the second driven gear, and arranged to divide a pump chamber into a first gear chamber in which the first gear set is disposed and a second gear chamber in which the second gear set is disposed, and each of the gear chambers is defined by the partition member and one of the sealing members between which the first and second gear sets are disposed.

21. A gear pump comprising:
a gearing adapted to be driven by a drive shaft;
a side plate member, which is made of a resin and which includes a side plate portion extending radially on a first side of the gearing, a side seal portion adjoining a first side surface of the gearing, and a tip seal portion adjoining an outer circumference of the gearing.

22. The gear pump as claimed in claim 21, wherein the side seal portion of the side plate member projects from the side plate portion toward the gearing axially, and the tip seal portion projects from the side plate portion toward the gearing axially beyond the side seal portion and extends circumferentially around the gearing to cover at least part of the outer circumference of the gearing.

23. The gear pump as claimed in claim 21, wherein the side plate portion of the side plate member is formed with a hole for receiving the drive shaft, and the side seal portion extends around the hole.

24. The gear pump as claimed in claim 21, wherein the side plate member defines a first side member, and, in addition to the first side member, the gear pump further comprises a second side member including a gear seal portion that includes a side seal portion, adjoining a second side surface of the gearing, and an engaging portion, abutting on the tip seal portion of the first side member.

25. The gear pump as claimed in claim 24, wherein the gear pump further comprises a holding member binding the tip seal portion of the first side member and the gear seal portion of the second side member to urge the tip seal portion toward the engaging portion of the second side member.

26. The gear pump as claimed in claim 24, wherein the tip seal portion of the first side member has a concave abutting surface facing radially inwards and extending axially from the side plate portion of the first side member located on the first side of the gearing to a second side of the gearing over the gearing, and the engagement portion of the second side member has a convex abutting surface facing radially outwards and abutting on the concave abutting surface of the tip seal portion of the first side member on the second side of the gearing.

27. The gear pump as claimed in claim 25, wherein the gearing includes a driving gear mounted on the drive shaft, and a driven gear engaged with the driving gear, the tip seal portion of the first side member includes two of the concave abutting surfaces facing radially inwards toward rotation axes of the driving gear and driven gear, respectively, and extending axially from the side plate portion of the first side member located on the first side of the gearing to the second side of the gearing over the respective gears, and the gear seal portion of the second side member includes two of the engagement portions having the convex abutting surfaces facing radially outwards and, respectively, abutting on the concave abutting surfaces of the tip seal portion of the first side member on the second side of the gearing.

28. The gear pump as claimed in claim 21, further comprising a housing member defining a higher pressure chamber communicating with an outlet port of the gear pump, wherein the side plate member includes a hollow portion defining a lower pressure chamber communicating with an inlet port of the gear pump, the side plate member is arranged to receive a lower pressure in the lower pressure chamber and a higher pressure in the higher pressure chamber so that the side seal portion is urged toward the side surface of the gearing, and the tip seal portion is urged toward the outer circumference of the gearing.

29. The gear pump as claimed in claim 28, wherein the hollow portion of the side plate member includes a through hole extending axially at such a position that the concave abutting surface is located between the rotation axis of the gearing and the through hole.

30. The gear pump as claimed in claim 2, wherein the sealing member is made of resin.

* * * * *